United States Patent
Yamane et al.

(10) Patent No.: US 11,736,054 B2
(45) Date of Patent: Aug. 22, 2023

(54) CONTROL DEVICE FOR ELECTRIC MOTOR

(71) Applicant: KABUSHIKI KAISHA TOYOTA JIDOSHOKKI, Kariya (JP)

(72) Inventors: Kazuki Yamane, Aichi-ken (JP); Nobuaki Yamada, Aichi-ken (JP); Masamichi Nawa, Aichi-ken (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 0 days.

(21) Appl. No.: 17/621,903

(22) PCT Filed: Jun. 22, 2020

(86) PCT No.: PCT/JP2020/024275
§ 371 (c)(1),
(2) Date: Dec. 22, 2021

(87) PCT Pub. No.: WO2020/262269
PCT Pub. Date: Dec. 30, 2020

(65) Prior Publication Data
US 2022/0263448 A1    Aug. 18, 2022

(30) Foreign Application Priority Data

Jun. 26, 2019  (JP) .................................. 2019-119125
Nov. 13, 2019  (JP) .................................. 2019-205216

(51) Int. Cl.
H02P 27/08    (2006.01)
H02P 6/08     (2016.01)
H02P 21/06    (2016.01)

(52) U.S. Cl.
CPC ................. *H02P 27/08* (2013.01); *H02P 6/08* (2013.01); *H02P 21/06* (2013.01)

(58) Field of Classification Search
CPC .......... H02P 27/00; H02P 27/04; H02P 27/06; H02P 27/08; H02P 27/085; H02P 21/00;
(Continued)

(56) References Cited

U.S. PATENT DOCUMENTS

| 2001/0015904 | A1  | 8/2001 | Kimura et al. |
| 2005/0174076 | A1* | 8/2005 | Katanaya ............ H02P 29/0241 318/400.28 |
| 2019/0253014 | A1  | 8/2019 | Iwaji et al. |

FOREIGN PATENT DOCUMENTS

| EP | 2787629 A1   | 10/2014 |
| JP | 2002-209386 A | 7/2002  |

(Continued)

*Primary Examiner* — Antony M Paul
(74) *Attorney, Agent, or Firm* — Sughrue Mion, PLLC

(57) ABSTRACT

There is provided a control device for an electric motor. The control device includes an inverter circuit and a control circuit. In a control cycle of the electric motor, the control cycle includes first to third sections. The control circuit outputs a first modulated wave in accordance with an output of the electric motor and outputs a minimum value or maximum value of a carrier wave as second and third modulated waves in the first section with a peak of first alternate-current voltage, and outputs the second modulated wave in accordance with an output of the electric motor and outputs the minimum value or maximum value of the carrier wave as the first and third modulated waves in the second section with a peak of second alternate-current voltage. The same output is applied in the third section with a peak of third alternate-current voltage.

6 Claims, 20 Drawing Sheets

(58) Field of Classification Search
CPC ............. H02P 21/0003; H02P 21/0021; H02P 21/0085; H02P 21/0089; H02P 21/14; H02P 21/18; H02P 21/22; H02P 23/00; H02P 23/0004; H02P 23/009; H02P 23/14; H02P 23/18; H02P 23/28; H02P 6/00; H02P 6/005; H02P 6/04; H02P 6/08; H02P 6/10; H02P 6/32; H02P 6/12; H02P 6/14; H02P 6/15; H02P 6/16; H02P 7/00; H02P 7/29

See application file for complete search history.

(56) References Cited

FOREIGN PATENT DOCUMENTS

| | | |
|---|---|---|
| JP | 2012-023885 A | 2/2012 |
| JP | 2012-130220 A | 7/2012 |
| JP | 2013-215041 A | 10/2013 |
| JP | 2014-204560 A | 10/2014 |
| JP | 2016-032373 A | 3/2016 |
| JP | 2018-064313 A | 4/2018 |

* cited by examiner

FIG. 5
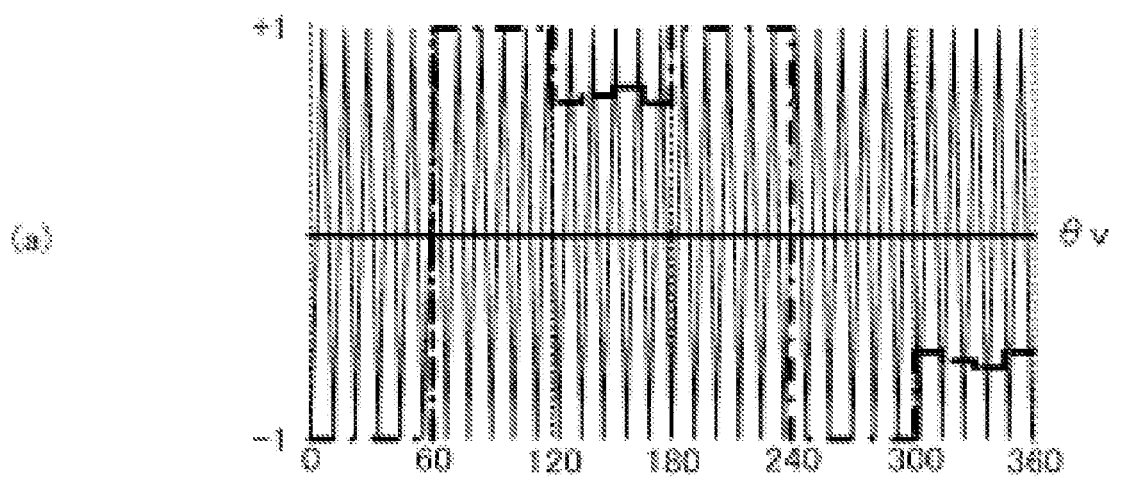
(a)
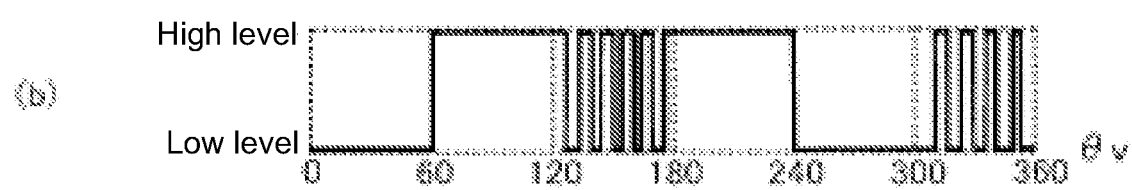
(b)
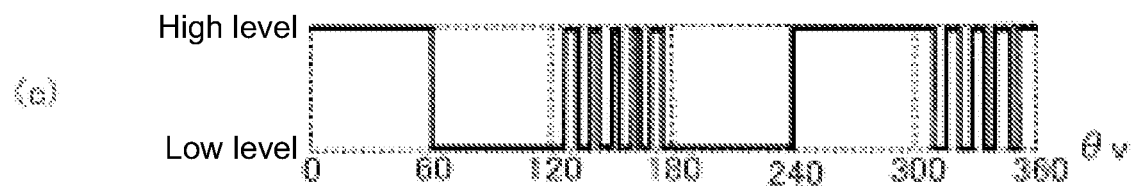
(c)

FIG. 9
(a) 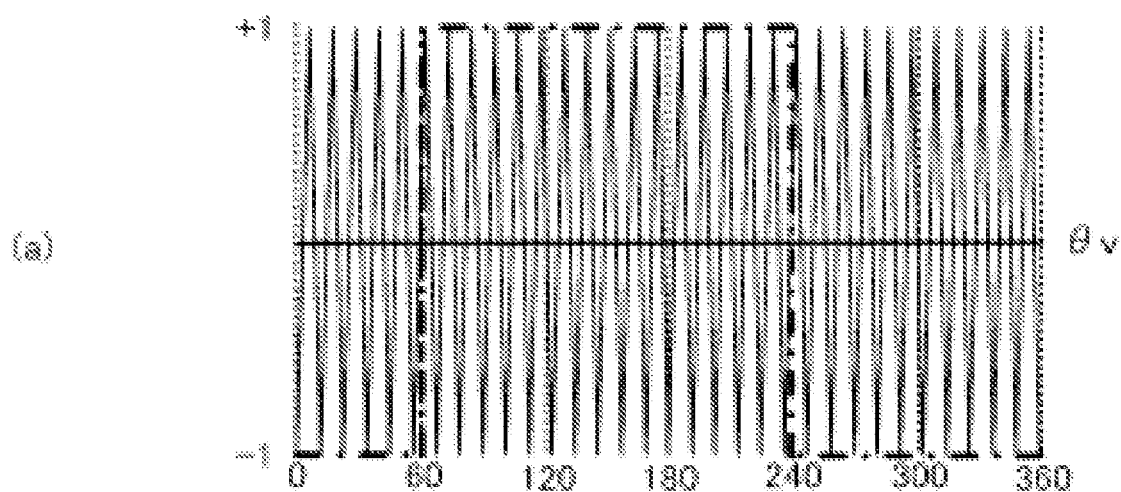
(b) 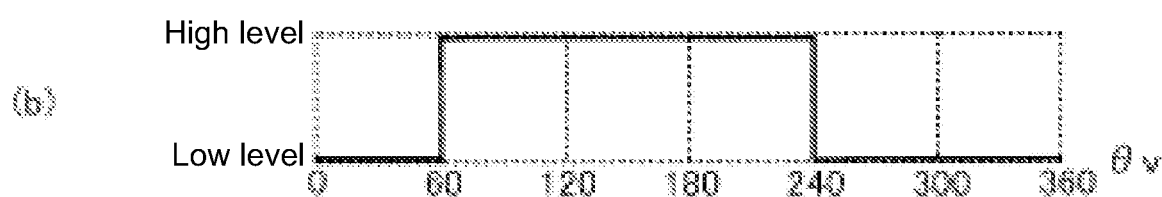
(c) 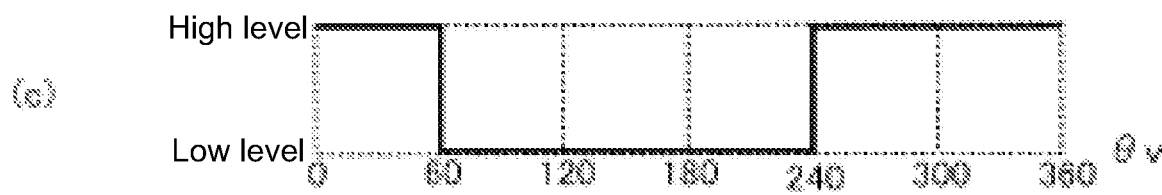

| Section | Vu* | Vv* | Vw* |
|---|---|---|---|
| 0~60 | −1 | Mref´ | −1 |
| 60~120 | Mref´ | +1 | +1 |
| 120~180 | −1 | −1 | Mref´ |
| 180~240 | +1 | Mref´ | +1 |
| 240~300 | Mref´ | −1 | −1 |
| 300~360 | +1 | +1 | Mref´ |

FIG. 11A

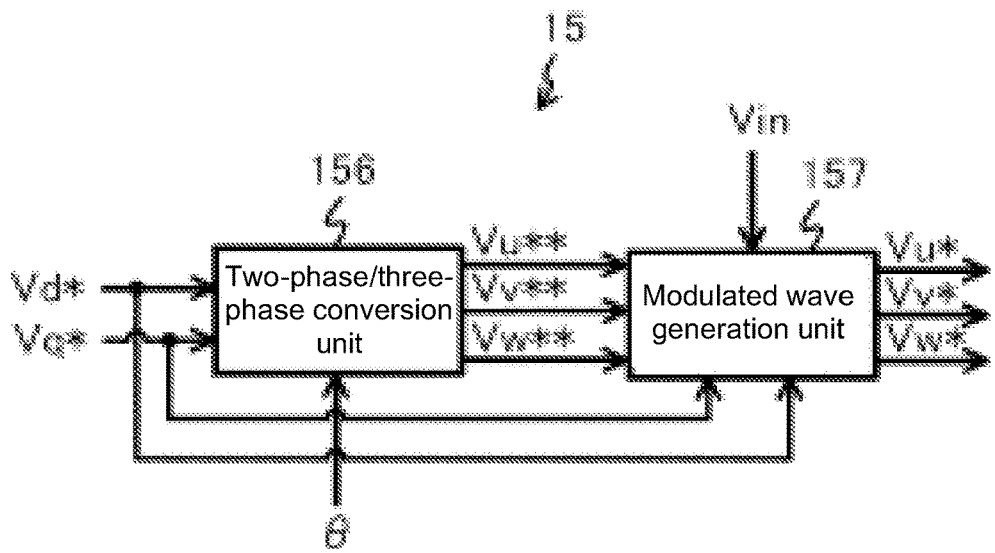

FIG. 11B

| Branch condition | Vu* | Vv* | Vw* |
|---|---|---|---|
| When absolute value of command value Vv** is larger than absolute value of command value Vu** and absolute value of command value Vw** and when command value Vv** is zero or larger | −1 | Mref´ | −1 |
| When absolute value of command value Vu** is larger than absolute value of command value Vv** and absolute value of command value Vw** and when command value Vu** is zero or larger | Mref´ | +1 | +1 |
| When absolute value of command value Vw** is larger than absolute value of command value Vv** and absolute value of command value Vu** and when command value Vw** is zero or larger | −1 | −1 | Mref´ |
| When absolute value of command value Vv** is larger than absolute value of command value Vu** and absolute value of command value Vw** and when command value Vv** is smaller than zero | +1 | Mref´ | +1 |
| When absolute value of command value Vu** is larger than absolute value of command value Vv** and absolute value of command value Vw** and when command value Vu** is smaller than zero | Mref´ | −1 | −1 |
| When absolute value of command value Vw** is larger than absolute value of command value Vv** and absolute value of command value Vu** and when command value Vw** is smaller than zero | +1 | +1 | Mref´ |

CONTROL DEVICE FOR ELECTRIC MOTOR

CROSS REFERENCE TO RELATED APPLICATIONS

This application is a National Stage of International Application No. PCT/JP2020/024275 filed Jun. 22, 2020, claiming priority based on Japanese Patent Application No. 2019-119125 filed Jun. 26, 2019 and Japanese Patent Application No. 2019-205216 filed Nov. 13, 2019, the contents of all of which are incorporated herein by reference in their entirety.

TECHNICAL FIELD

The present disclosure relates to a control device for an electric motor.

BACKGROUND ART

Some of control devices for electric motors transition from three-phase modulation control and weak field control (two-phase modulation control, third-order harmonic superposition control, or the like) to rectangular wave control as the outputs of the electric motors are increased. Related art includes Patent Literature 1.

In the control device mentioned above, however, in the transition from three-phase modulation control or weak field control to rectangular wave control, the ON time of a switching element of an inverter circuit that drives the electric motor suddenly becomes longer, and thus, there is a possibility that the current flowing through the electric motor suddenly may change the torque of the electric motor and then cause a shock to a load connected to the electric motor.

Then, other control devices for electric motors include a control device that refers to a map indicating the correspondence relationship between the torque or rotational speed of the electric motor and a drive signal for driving a switching element, then determines a drive signal corresponding to a target torque or a target rotational speed, and drives the electric motor with the drive signal determined. Related art includes Patent Literature 2.

CITATION LIST

Patent Literature

Patent Literature 1: Japanese Patent Application Publication No. 2018-64313
Patent Literature 2: Japanese Patent Application Publication No. 2013-215041

SUMMARY OF INVENTION

Technical Problem

In the other control device mentioned above, however, it is necessary to interpolate the value of the map such that the torque is not suddenly changed even if the output of the electric motor is increased, and thus, there is a possibility of increasing the calculation load.

An object according to one aspect of the present disclosure is to reduce a calculation load while suppressing a fluctuation in the torque of an electric motor with a change in the output of the electric motor in a control device for the electric motor.

Solution to Problem

A control device for an electric motor according to one embodiment of the present disclosure includes an inverter circuit and a control circuit.

The inverter circuit includes: a first switching element that is repeatedly turned on and off at a duty ratio in accordance with a first modulated wave in the case where the first modulated wave is smaller than the maximum value of the carrier wave and larger than the minimum value of the carrier wave, and is always turned on or always turned off in the case where the first modulated wave is the minimum value or maximum value of the carrier wave; a second switching element that is repeatedly turned on and off at a duty ratio in accordance with a second modulated wave in the case where the second modulated wave is smaller than the maximum value of the carrier wave and larger than the minimum value of the carrier wave, and is always turned on or always turned off in the case where the second modulated wave is the minimum value or maximum value of the carrier wave; and a third switching element that is repeatedly turned on and off at a duty ratio in accordance with a third modulated wave in the case where the third modulated wave is smaller than the maximum value of the carrier wave and larger than the minimum value of the carrier wave, and is always turned on or always turned off in the case where the third modulated wave is the minimum value or maximum value of the carrier wave, and the first to third switching elements are turned on or off to apply first to third alternate-current voltages that differ in phase from each other to three phases of the electric motor to drive the electric motor.

The control circuit, in a control cycle of the electric motor including first to third sections, outputs the first modulated wave in accordance with an output of the electric motor and outputs the minimum value or maximum value of the carrier wave as the second and third modulated waves in the first section with a peak of the first alternate-current voltage, outputs the second modulated wave in accordance with an output of the electric motor and outputs the minimum value or maximum value of the carrier wave as the first and third modulated waves in the second section with a peak of the second alternate-current voltage, and outputs the third modulated wave in accordance with an output of the electric motor and outputs the minimum value or maximum value of the carrier wave as the first and second modulated waves in the third section with a peak of the third alternate-current voltage.

Thus, in the control cycle (first to third sections) of the electric motor, in the case where the first to third modulated waves in accordance with the output of the electric motor are smaller than the maximum value of the carrier wave and larger than the minimum value of the carrier wave, the switching elements in one phase among the switching elements in the three phases may be repeatedly turned on and off, that is, the one-phase modulation control may be performed. In addition, in the control cycle of the electric motor, in the case where the first to third modulated waves in accordance with the output of the electric motor are the minimum value or maximum value of the carrier wave, each of the switching elements in the three phases may be always turned on or off, that is, the rectangular wave control may be performed. In addition, in the control cycle of the electric motor, the switching elements may be turned on and off at duty ratios in accordance with the first to third modulated waves, and the ON times of the switching elements may be gradually changed in accordance with the output of the electric motor. Thus, even if the increased output of the electric motor makes a transition from the one-phase modulation control to the rectangular wave control, the ON times of the switching elements may be seamlessly changed, and accordingly, distortion of the current flowing through the electric motor may be suppressed, and fluctuation of the torque may be suppressed. In addition, the phase in which the switching elements are switched has only to be switched for each of the first to third sections, without any complicated calculation required, and the calculation load of the control device may be thus reduced.

In addition, the control device for the electric motor may include an electric angle detection unit that detects an electric angle of a rotor of the electric motor, and the control circuit may include: a target electric angle calculation unit that calculates a target electric angle from a voltage command value in accordance with an output of the electric motor and the electric angle detected by the electric angle detection unit; and a modulated wave generation unit that, with the target electric angle within the first section, determines a modulation factor obtained by using an input voltage of the inverter circuit and the voltage command value as the first modulated wave and determines the minimum value or maximum value of the carrier wave as the second and third modulated waves, with the target electric angle within the second section, determines a modulation factor obtained by using the input voltage of the inverter circuit and the voltage command value as the second modulated wave and determines the minimum value or maximum value of the carrier wave as the first and third modulated waves, and with the target electric angle within the third section, determines a modulation factor obtained by using the input voltage of the inverter circuit and the voltage command value as the third modulated wave and determines the minimum value or maximum value of the carrier wave as the first and second modulated waves.

In addition, the control device for the electric motor may include an electric angle detection unit that detects an electric angle of a rotor of the electric motor, and the control circuit may include: a voltage command value calculation unit that calculates a first voltage command value corresponding to the first alternate-current voltage, a second voltage command value corresponding to the second alternate-current voltage, and a third voltage command value corresponding to the third alternate-current voltage from a voltage command value in accordance with an output of the electric motor and the electric angle detected by the electric angle detection unit; and a modulated wave generation unit that, with the first voltage command value being larger in absolute value than the second and third voltage command values, determines a modulation factor obtained by using an input voltage of the inverter circuit and the voltage command value as the first modulated wave and determines the minimum value or maximum value of the carrier wave as the second and third modulated waves, with the second voltage command value being larger in absolute value than the first and third voltage command values, determines a modulation factor obtained by using the input voltage of the inverter circuit and the voltage command value as the second modulated wave and determines the minimum value or maximum value of the carrier wave as the first and third modulated waves, and with the third voltage command value being larger in absolute value than the first and second voltage command values, determines a modulation factor obtained by using the input voltage of the inverter circuit and the voltage command value as the third modulated wave and determines the minimum value or maximum value of the carrier wave as the first and second modulated waves.

In addition, if there is the switching timing from the first section to the second section, the switching timing from the second section to the third section, or the switching timing from the third section to the first section in the next calculation cycle, the control circuit may be configured to match the start timing of the next calculation cycle with the switching timing.

Thus, the respective values of the first to third modulated waves may be switched at the switching timing from the first section to the second section, the switching timing from the second section to the third section, or the switching timing from the third section to the first section, and this, the switching elements can be prevented from being turned on in the case where it is not necessary to turn on the switching elements, whereas the switching elements may be prevented from being turned off in the case where it is necessary to turn on the switching elements, the distortion generated in the current flowing through the electric motor may be further suppressed, and the fluctuation in torque may be further suppressed.

In addition, the control circuit may be configured to shift the switching timings of the respective values of the first to third modulated waves such that the switching timings of the respective values of the first to third modulated waves do not overlap with each other at the switching timing from the first section to the second section, the switching timing from the second section to the third section, or the switching timing from the third section to the first section.

Then, the switching elements that differ from each other may be kept from being simultaneously turned on, and thus, the generation of reverse polarity pulses (surge voltages) may be suppressed, and electromagnetic noises may be suppressed. Accordingly, the distortion generated in the current flowing through the electric motor may be further suppressed, and the fluctuation in torque may be further suppressed.

In addition, if there is the switching timing from the first section to the second section, the switching timing from the second section to the third section, or the switching timing from the third section to the first section in the next calculation cycle, the control circuit may be configured to determine the switching time from the start timing of the next calculation cycle to the switching timing, and set a frequency that is the reciprocal of the switching time as the frequency of the carrier wave in the period from the start timing of the next calculation cycle to the lapse of the switching time.

Thus, the error between the duty ratio of the drive signal and a desired duty ratio may be reduced, and thus, lower-order harmonics may be kept from being applied onto the current flowing through the electric motor, and torque ripples and noise vibrations may be kept from being increased.

Advantageous Effects of Invention

According to the present disclosure, in the control device for the electric motor, the calculation load may be reduced while suppressing the fluctuation in the torque of the electric motor with the change in the output of the electric motor.

BRIEF DESCRIPTION OF DRAWINGS

FIG. 5 is a diagram illustrating an example of comparison between a W-phase modulated wave and a carrier wave and a drive signal in one-phase modulation control.

FIG. 9 is a diagram illustrating an example of comparison between a W-phase modulated wave and a carrier wave and a drive signal in rectangular wave control.

FIG. 11A is a diagram illustrating another example of the dq/uvw conversion unit, and FIG. 11B is a diagram illustrating an example of information.

DESCRIPTION OF EMBODIMENTS

Hereinafter, embodiments will be described in detail with reference to the drawings.

Figure 1:
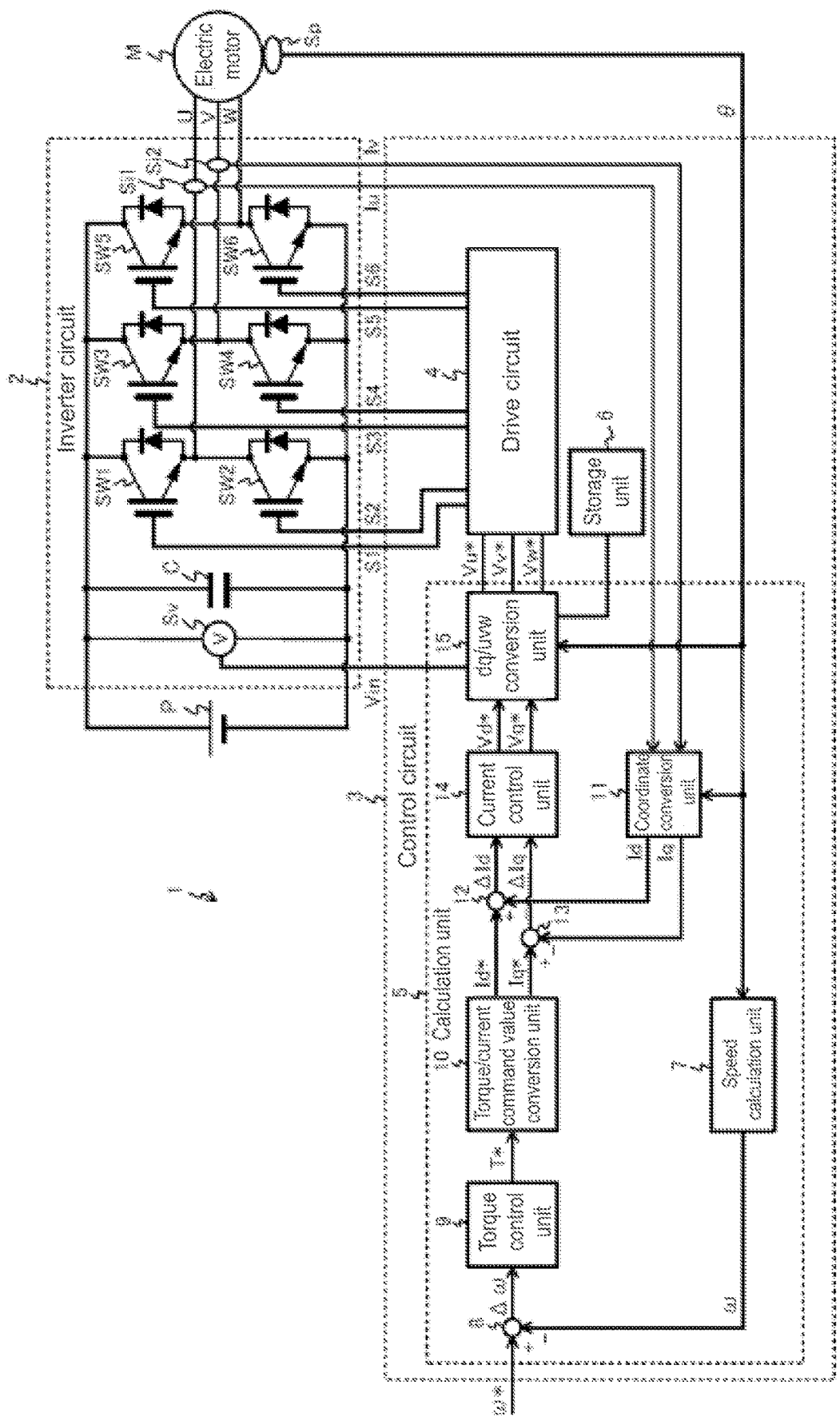
FIG. 1 is a diagram illustrating an example of a control device for an electric motor according to an embodiment.

FIG. 1 is a diagram illustrating an example of a control device for an electric motor according to an embodiment.

A control device 1 illustrated in FIG. 1, which is a control device for driving an electric motor M mounted on a vehicle such as an electric forklift or a plug-in hybrid vehicle, includes an inverter circuit 2 and a control circuit 3. It is to be noted that the electric motor M includes an electric angle detection unit Sp (such as a resolver) that detects an electric angle θ of a rotor and transmits the detected electric angle θ to the control circuit 3.

The inverter circuit 2 drives the electric motor M with direct-current power supplied from a direct-current power supply P, and includes a voltage sensor Sv, a capacitor C, switching elements SW1 to SW6 (such as an IGBT (Insulated Gate Bipolar Transistor)), and current sensors Si1 and Si2. More specifically, one end of the capacitor C is connected to a positive terminal of the direct-current power supply P and respective collector terminals of the switching elements SW1, SW3, and SW5, and the other end of the capacitor C is connected to a negative terminal of the direct-current power supply P and respective emitter terminals of the switching elements SW2, SW4, and SW6. The connection point between an emitter terminal of the switching element SW1 and a collector terminal of the switching element SW2 is connected to a U-phase input terminal of the electric motor M via the current sensor Si1. The connection point between an emitter terminal of the switching element SW3 and a collector terminal of the switching element SW4 is connected to a V-phase input terminal of the electric motor M via the current sensor Si2. The connection point between an emitter terminal of the switching element SW5 and a collector terminal of the switching element SW6 is connected to a W-phase input terminal of the electric motor M.

The voltage sensor Sv detects an input voltage Vin output from the direct-current power supply P and input to the inverter circuit 2, and transmits the detected input voltage Vin to the control circuit 3.

The capacitor C smooths the input voltage Vin.

The switching element SW1 (second switching element) is turned on with a drive signal S1 at a high level, and turned off with the drive signal S1 at a low level. Specifically, the switching element SW1 is repeatedly turned on and off in accordance with the drive signal S1 that has a duty ratio in accordance with a U-phase modulated wave Vu* (second modulated wave) in accordance with the output of the electric motor M in the case where the U-phase modulated wave Vu* is smaller than the maximum value of the carrier wave and larger than the minimum value of the carrier wave, always turned on with the duty ratio of the drive signal S1 at 100[%] in the case where the U-phase modulated wave Vu* is the maximum value of the carrier wave, or always turned off with the duty ratio of the drive signal S1 at 0[%] in the case where the U-phase modulated wave Vu* is the minimum value of the carrier wave. Further, in the case where the U-phase modulated wave Vu* is smaller than the maximum value of the carrier wave and larger than the minimum value of the carrier wave, with the increased output of the electric motor M, the duty ratio of the drive signal S1 will be increased when the U-phase modulated wave Vu* is closer to the maximum value of the carrier wave, whereas the duty ratio of the drive signal S1 will be decreased when the U-phase modulated wave Vu* is closer to the minimum value of the carrier wave. More specifically, in the case where the U-phase modulated wave Vu* is smaller than the maximum value of the carrier wave and larger than the minimum value of the carrier wave, the switching element SW1 is repeatedly turned on and off at a duty ratio in accordance with the output of the electric motor M. It is to be noted that the carrier wave is a triangular wave, a sawtooth wave (sawtooth wave), an inverse sawtooth wave, or the like.

The switching element SW2 (second switching element) is turned on with a drive signal S2 at a high level, and turned off with the drive signal S2 at a low level. Specifically, the switching element SW2 is repeatedly turned on and off in accordance with the drive signal S2 that has a duty ratio in accordance with the U-phase modulated wave Vu* in the case where the U-phase modulated wave Vu* is smaller than the maximum value of the carrier wave and larger than the minimum value of the carrier wave, always turned off with the duty ratio of the drive signal S2 at 0[%] in the case where the U-phase modulated wave Vu* is the maximum value of the carrier wave, or always turned on with the duty ratio of the drive signal S2 at 100[%] in the case where the U-phase modulated wave Vu* is the minimum value of the carrier wave. Further, in the case where the U-phase modulated wave Vu* is smaller than the maximum value of the carrier wave and larger than the minimum value of the carrier wave, with the increased output of the electric motor M, the duty ratio of the drive signal S2 will be decreased when the U-phase modulated wave Vu* is closer to the maximum value of the carrier wave, whereas the duty ratio of the drive signal S2 will be increased when the U-phase modulated wave Vu* is closer to the minimum value of the carrier wave. More specifically, in the case where the U-phase modulated wave Vu* is smaller than the maximum value of the carrier wave and larger than the minimum value of the carrier wave, the switching element SW2 is repeatedly turned on and off at a duty ratio in accordance with the output of the electric motor M.

The switching element SW3 (first switching element) is turned on with a drive signal S3 at a high level, and turned off with the drive signal S3 at a low level. Specifically, the switching element SW3 is repeatedly turned on and off in accordance with the drive signal S3 that has a duty ratio in accordance with a V-phase modulated wave Vv* (first modulated wave) in accordance with the output of the electric motor M in the case where the V-phase modulated wave Vv* is smaller than the maximum value of the carrier wave and larger than the minimum value of the carrier wave, always turned on with the duty ratio of the drive signal S3 at 100[%] in the case where the V-phase modulated wave Vv* is the maximum value of the carrier wave, or always turned off with the duty ratio of the drive signal S3 at 0[%] in the case where the V-phase modulated wave Vv* is the minimum value of the carrier wave. Further, in the case where the V-phase modulated wave Vv* is smaller than the maximum value of the carrier wave and larger than the minimum value of the carrier wave, with the increased output of the electric motor M, the duty ratio of the drive signal S3 will be increased when the V-phase modulated wave Vv* is closer to the maximum value of the carrier wave, whereas the duty ratio of the drive signal S3 will be decreased when the V-phase modulated wave Vv* is closer to the minimum value of the carrier wave. More specifically, in the case where the V-phase modulated wave Vv* is smaller than the maximum value of the carrier wave and larger than the minimum value of the carrier wave, the switching element SW3 is repeatedly turned on and off at a duty ratio in accordance with the output of the electric motor M.

The switching element SW4 (first switching element) is turned on with a drive signal S4 at a high level, and turned off with the drive signal S4 at a low level. Specifically, the switching element SW4 is repeatedly turned on and off in accordance with the drive signal S4 that has a duty ratio in accordance with the V-phase modulated wave Vv* in the case where the V-phase modulated wave Vv* is smaller than the maximum value of the carrier wave and larger than the minimum value of the carrier wave, always turned off with the duty ratio of the drive signal S4 at 0[%] in the case where the V-phase modulated wave Vv* is the maximum value of the carrier wave, or always turned on with the duty ratio of the drive signal S4 at 100[%] in the case where the V-phase modulated wave Vv* is the minimum value of the carrier wave. Further, in the case where the V-phase modulated wave Vv* is smaller than the maximum value of the carrier wave and larger than the minimum value of the carrier wave, with the increased output of the electric motor M, the duty ratio of the drive signal S4 will be decreased when the V-phase modulated wave Vv* is closer to the maximum value of the carrier wave, whereas the duty ratio of the drive signal S4 will be increased when the V-phase modulated wave Vv* is closer to the minimum value of the carrier wave. More specifically, in the case where the V-phase modulated wave Vv* is smaller than the maximum value of the carrier wave and larger than the minimum value of the carrier wave, the switching element SW4 is repeatedly turned on and off at a duty ratio in accordance with the output of the electric motor M.

The switching element SW5 (third switching element) is turned on with a drive signal S5 at a high level, and turned off with the drive signal S5 at a low level. Specifically, the switching element SW5 is repeatedly turned on and off in accordance with the drive signal S5 that has a duty ratio in accordance with a W-phase modulated wave Vw* (third modulated wave) in accordance with the output of the electric motor M in the case where the W-phase modulated wave Vw* is smaller than the maximum value of the carrier wave and larger than the minimum value of the carrier wave, always turned on with the duty ratio of the drive signal S5 at 100[%] in the case where the W-phase modulated wave Vw* is the maximum value of the carrier wave, or always turned off with the duty ratio of the drive signal S5 at 0[%] in the case where the W-phase modulated wave Vw* is the minimum value of the carrier wave. Further, in the case where the W-phase modulated wave Vw* is smaller than the maximum value of the carrier wave and larger than the minimum value of the carrier wave, with the increased output of the electric motor M, the duty ratio of the drive signal S5 will be increased when the W-phase modulated wave Vw* is closer to the maximum value of the carrier wave, whereas the duty ratio of the drive signal S5 will be decreased when the W-phase modulated wave Vw* is closer to the minimum value of the carrier wave. More specifically, in the case where the W-phase modulated wave Vw* is smaller than the maximum value of the carrier wave and larger than the minimum value of the carrier wave, the switching element SW5 is repeatedly turned on and off at a duty ratio in accordance with the output of the electric motor M.

The switching element SW6 (third switching element) is turned on with a drive signal S6 at a high level, and turned off with the drive signal S6 at a low level. Specifically, the switching element SW6 is repeatedly turned on and off in accordance with the drive signal S6 that has a duty ratio in accordance with the W-phase modulated wave Vw* in the case where the W-phase modulated wave Vw* is smaller than the maximum value of the carrier wave and larger than the minimum value of the carrier wave, always turned off with the duty ratio of the drive signal S6 at 0[%] in the case where the W-phase modulated wave Vw* is the maximum value of the carrier wave, or always turned on with the duty ratio of the drive signal S6 at 100[%] in the case where the W-phase modulated wave Vw* is the minimum value of the carrier wave. Further, in the case where the W-phase modulated wave Vw* is smaller than the maximum value of the carrier wave and larger than the minimum value of the carrier wave, with the increased output of the electric motor M, the duty ratio of the drive signal S6 will be decreased when the W-phase modulated wave Vw* is closer to the maximum value of the carrier wave, whereas the duty ratio of the drive signal S6 will be increased when the W-phase modulated wave Vw* is closer to the minimum value of the carrier wave. More specifically, in the case where the W-phase modulated wave Vw* is smaller than the maximum value of the carrier wave and larger than the minimum value of the carrier wave, the switching element SW6 is repeatedly turned on and off at a duty ratio in accordance with the output of the electric motor M. It is to be noted that in the case where the drive signals S1 to S6 are not particularly distinguished, the drive signals S1 to S6 are referred to simply as drive signals S.

When the switching elements SW1 to SW6 are each turned on or off, the direct-current input voltage Vin output from the direct-current power supply P is converted to a first alternate-current voltage Vv, a second alternate-current voltage Vu, and a third alternate-current voltage Vw that differ in phase from each other by 120 degrees. Then, the first alternate-current voltage Vv, the second alternate-current voltage Vu, and the third alternate-current voltage Vw are applied respectively to the V-phase input terminal, U-phase input terminal, and W-phase input terminal of the electric motor M, thereby rotating the rotor of the electric motor M.

The current sensor Si1 includes a Hall element, a shunt resistor, and the like, and detects a U-phase current Iu flowing through the U-phase of the electric motor M and outputs the U-phase current Iu to the control circuit 3. In addition, the current sensor Si2 includes a Hall element, a shunt resistor, and the like, detects a V-phase current Iv flowing through the V-phase of the electric motor M, and outputs the V-phase current Iv to the control circuit 3.

The control circuit 3 includes a drive circuit 4, a calculation unit 5, and a storage unit 6. It is to be noted that the storage unit 6 includes a random access memory (RAM), a read only memory (ROM), or the like, and stores information D1 that represents correspondence relationships between sections and the U-phase modulated wave Vu*, the V-phase modulated wave Vv*, and the W-phase modulated wave Vw*, information D2 that represents correspondence relationships between branching conditions and the U-phase modulated wave Vu*, the V-phase modulated wave Vv*, and the W-phase modulated wave Vw*, and the like, which will be described later.

The drive circuit 4 includes an integrated circuit (IC) and the like, compares the U-phase modulated wave Vu*, V-phase modulated wave Vv*, and W-phase modulated wave Vw* output from the calculation unit 5 with the carrier wave, and outputs the drive signals S1 to S6 corresponding to the comparison results to the respective gate terminals of the switching elements SW1 to SW6.

For example, in the case where the U-phase modulated wave Vu* is smaller than the maximum value of the carrier wave and larger than the minimum value of the carrier wave, the drive circuit 4 outputs the drive signal S1 with the duty ratio increased as the U-phase modulated wave Vu* is closer to the maximum value of the carrier wave, and outputs the drive signal S1 with the duty ratio decreased as the U-phase modulated wave Vu* is closer to the minimum value of the carrier wave. In addition, the drive circuit 4 outputs the drive signal S1 with the duty ratio of 100[%] in the case where the U-phase modulated wave Vu* is the maximum value of the carrier wave, and outputs the drive signal S1 with the duty ratio of 0[%] in the case where the U-phase modulated wave Vu* is the minimum value of the carrier wave.

In addition, in the case where the U-phase modulated wave Vu* is smaller than the maximum value of the carrier wave and larger than the minimum value of the carrier wave, the drive circuit 4 outputs the drive signal S2 with the duty ratio decreased as the U-phase modulated wave Vu* is closer to the maximum value of the carrier wave, and outputs the drive signal S2 with the duty ratio increased as the U-phase modulated wave Vu* is closer to the minimum value of the carrier wave. In addition, the drive circuit 4 outputs the drive signal S2 with the duty ratio of 0[%] in the case where the U-phase modulated wave Vu* is the maximum value of the carrier wave, and outputs the drive signal S2 with the duty ratio of 100[%] in the case where the U-phase modulated wave Vu* is the minimum value of the carrier wave.

In addition, in the case where the V-phase modulated wave Vv* is smaller than the maximum value of the carrier wave and larger than the minimum value of the carrier wave, the drive circuit 4 outputs the drive signal S3 with the duty ratio increased as the V-phase modulated wave Vv* is closer to the maximum value of the carrier wave, and outputs the drive signal S3 with the duty ratio decreased as the V-phase modulated wave Vv* is closer to the minimum value of the carrier wave. In addition, the drive circuit 4 outputs the drive signal S3 with the duty ratio of 100[%] in the case where the V-phase modulated wave Vv* is the maximum value of the carrier wave, and outputs the drive signal S3 with the duty ratio of 0[%] in the case where the V-phase modulated wave Vv* is the minimum value of the carrier wave.

In addition, in the case where the V-phase modulated wave Vv* is smaller than the maximum value of the carrier wave and larger than the minimum value of the carrier wave, the drive circuit 4 outputs the drive signal S4 with the duty ratio decreased as the V-phase modulated wave Vv* is closer to the maximum value of the carrier wave, and outputs the drive signal S4 with the duty ratio increased as the V-phase modulated wave Vv* is closer to the minimum value of the carrier wave. In addition, the drive circuit 4 outputs the drive signal S4 with the duty ratio of 0[%] in the case where the V-phase modulated wave Vv* is the maximum value of the carrier wave, and outputs the drive signal S4 with the duty ratio of 100[%] in the case where the V-phase modulated wave Vv* is the minimum value of the carrier wave.

In addition, in the case where the W-phase modulated wave Vw* is smaller than the maximum value of the carrier wave and larger than the minimum value of the carrier wave, the drive circuit 4 outputs the drive signal S5 with the duty ratio increased as the W-phase modulated wave Vw* is closer to the maximum value of the carrier wave, and outputs the drive signal S5 with the duty ratio decreased as the W-phase modulated wave Vw* is closer to the minimum value of the carrier wave. In addition, the drive circuit 4 outputs the drive signal S5 with the duty ratio of 100[%] in the case where the W-phase modulated wave Vw* is the maximum value of the carrier wave, and outputs the drive signal S5 with the duty ratio of 0[%] in the case where the W-phase modulated wave Vw* is the minimum value of the carrier wave.

In addition, in the case where the W-phase modulated wave Vw* is smaller than the maximum value of the carrier wave and larger than the minimum value of the carrier wave, the drive circuit 4 outputs the drive signal S6 with the duty ratio decreased as the W-phase modulated wave Vw* is closer to the maximum value of the carrier wave, and outputs the drive signal S6 with the duty ratio increased as the W-phase modulated wave Vw* is closer to the minimum value of the carrier wave. In addition, the drive circuit 4 outputs the drive signal S6 with the duty ratio of 0[%] in the case where the W-phase modulated wave Vw* is the maximum value of the carrier wave, and outputs the drive signal S6 with the duty ratio of 100[%] in the case where the W-phase modulated wave Vw* is the minimum value of the carrier wave.

It is to be noted that the drive circuit 4 is adapted to perform one-phase modulation control or rectangular wave control in the control cycle (0 to 360 [deg]) of the electric motor M. The one-phase modulation control is regarded as control of repeatedly turning on and off the switching elements for one of the three phases and always turning on or always turning off the switching elements for the other two. In addition, the drive circuit 4 is adapted to switch the phase in which the switching element is repeatedly turned on and off, in order (for example, in the order of the V phase, the U phase, and the W phase) for every 60 degrees of the control cycle of the electric motor M in the case of performing the one-phase modulation control. In addition, the rectangular wave control is regarded as control of always turning on or always turning off the switching elements for each of the three phases.

The calculation unit 5 includes a microcomputer and the like, and includes a speed calculation unit 7, a subtraction unit 8, a torque control unit 9, a torque/current command value conversion unit 10, a coordinate conversion unit 11, a subtraction unit 12, a subtraction unit 13, a current control unit 14, and a dq/uvw conversion unit 15. For example, the microcomputer executes a program stored in the storage unit 6 to activate the speed calculation unit 7, the subtraction unit 8, the torque control unit 9, the torque/current command value conversion unit 10, the coordinate conversion unit 11, the subtraction unit 12, the subtraction unit 13, the current control unit 14, and the dq/uvw conversion unit 15.

The speed calculation unit 7 calculates the rotational speed ω of the rotor of the electric motor M with the use of the electric angle θ detected by the electric angle detection unit Sp. For example, the speed calculation unit 7 divides the electric angle θ by the operation clock of calculation unit 5 to determine the rotational speed ω.

The subtraction unit 8 calculates the difference Δω between a rotational speed command value ω* externally input and the rotational speed ω output from the speed calculation unit 7.

The torque control unit 9 uses the difference Δω output from the subtraction unit 8 to determine a torque command value T*. For example, the torque control unit 9 refers to information stored in the storage unit 6, in which the rotational speed of the rotor of the electric motor M and the torque of the electric motor M are associated with each other, to determine the torque corresponding to the rotational speed corresponding to the difference Δω as the torque command value T*.

The torque/current command value conversion unit 10 converts the torque command value T* output from torque control unit 9 to a d-axis current command value Id* and a q-axis current command value Iq*. For example, the torque/current command value conversion unit 10 refers to the information stored in the storage unit 6, in which the torque of the electric motor M and the d-axis current command value Id* and q-axis current command value Iq* are associated with each other, to determine the d-axis current command value Id* and the q-axis current command value Iq* corresponding to the torque corresponding to the torque command value T*.

The coordinate conversion unit 11 uses the U-phase current Iu detected by the current sensor Si1 and the V-phase current Iv detected by the current sensor Si2 to determine a W-phase current Iw flowing through the W phase of the electric motor M. In addition, the coordinate conversion unit 11 converts the U-phase current Iu, the V-phase current Iv, and the W-phase current Iw to a d-axis current Id (a current component for generating a weak field) and a q-axis current Iq (a current component for generating a torque) with the use of the electric angle θ detected by the electric angle detection unit Sp.

It is to be noted that the currents detected by the current sensors Si1 and Si2 are not limited to the combination of the U-phase current Iu and the V-phase current Iv, and may be a combination of the V-phase current Iv and the W-phase current Iw or a combination of the U-phase current Iu and the W-phase current Iw. In the case where the V-phase current Iv and the W-phase current Iw are detected by the current sensors Si1 and Si2, the coordinate conversion unit 11 uses the V-phase current Iv and the W-phase current Iw to determine the U-phase current Iu. In addition, in the case where the U-phase current Iu and the W-phase current Iw are detected by the current sensors Si1 and Si2, the coordinate conversion unit 11 uses the U-phase current Iu and the W-phase current Iw to determine the V-phase current Iv.

In addition, in the case where the inverter circuit 2 further includes a current sensor Si3 that detects a current flowing through the W phase of the electric motor M in addition to the current sensors Si1 and Si2, the coordinate conversion unit 11 may be configured to convert the U-phase current Iu, V-phase current Iv, and W-phase current Iw detected by the current sensors Si1 to Si3 to the d-axis current Id and the q-axis current Iq with the use of the electric angle θ detected by the electric angle detection unit Sp.

The subtraction unit 12 calculates the difference ΔId between the d-axis current command value Id* output from torque/current command value conversion unit 10 and the d-axis current Id output from the coordinate conversion unit 11.

The subtraction unit 13 calculates the difference ΔIq between the q-axis current command value Iq* output from torque/current command value conversion unit 10 and the q-axis current Iq output from the coordinate conversion unit 11.

The current control unit 14 calculates a d-axis voltage command value Vd* and a q-axis voltage command value Vq* by proportional integral (PI) control with the use of the difference ΔId output from the subtraction unit 12 and the difference ΔIq output from the subtraction unit 13. For example, the current control unit 14 calculates the d-axis voltage command value Vd* with the use of the following formula 1 and calculates the q-axis voltage command value Vq* with the use of the following formula 2. It is to be noted that Kp is a constant of a proportional term for the PI control, Ki is a constant of an integral term for the PI control, Lq is the q-axis inductance of a coil constituting the electric motor M, Ld is the d-axis inductance of a coil constituting the electric motor M, ω is the rotational speed of the rotor of the electric motor M, and Ke is an induced voltage constant.

d-axis voltage command value $Vd^* = Kp \times \text{difference } \Delta Id + \int (Ki \times \text{difference } \Delta Id) - \omega Lq Iq$    Formula 1 q-axis voltage command value $Vq^* = Kp \times \text{difference } \Delta Iq + \int (Ki \times \text{difference } \Delta Iq) + \omega Ld Id + \omega Ke$    Formula 2

The dq/uvw conversion unit 15 converts the d-axis voltage command value Vd* and the q-axis voltage command value Vq* to the U-phase modulated wave Vu*, the V-phase modulated wave Vv*, and the W-phase modulated wave Vw* with the use of the input voltage Vin detected by the voltage sensor Sv and the electric angle θ detected by the electric angle detection unit Sp. It is to be noted that the results (U-phase modulated wave Vu*, V-phase modulated wave Vv*, and W-phase modulated wave Vw*) calculated by the calculation unit 5 will be reflected in the operation of the inverter circuit 2 in the next calculation cycle T of the calculation unit 5.

Figure 2:
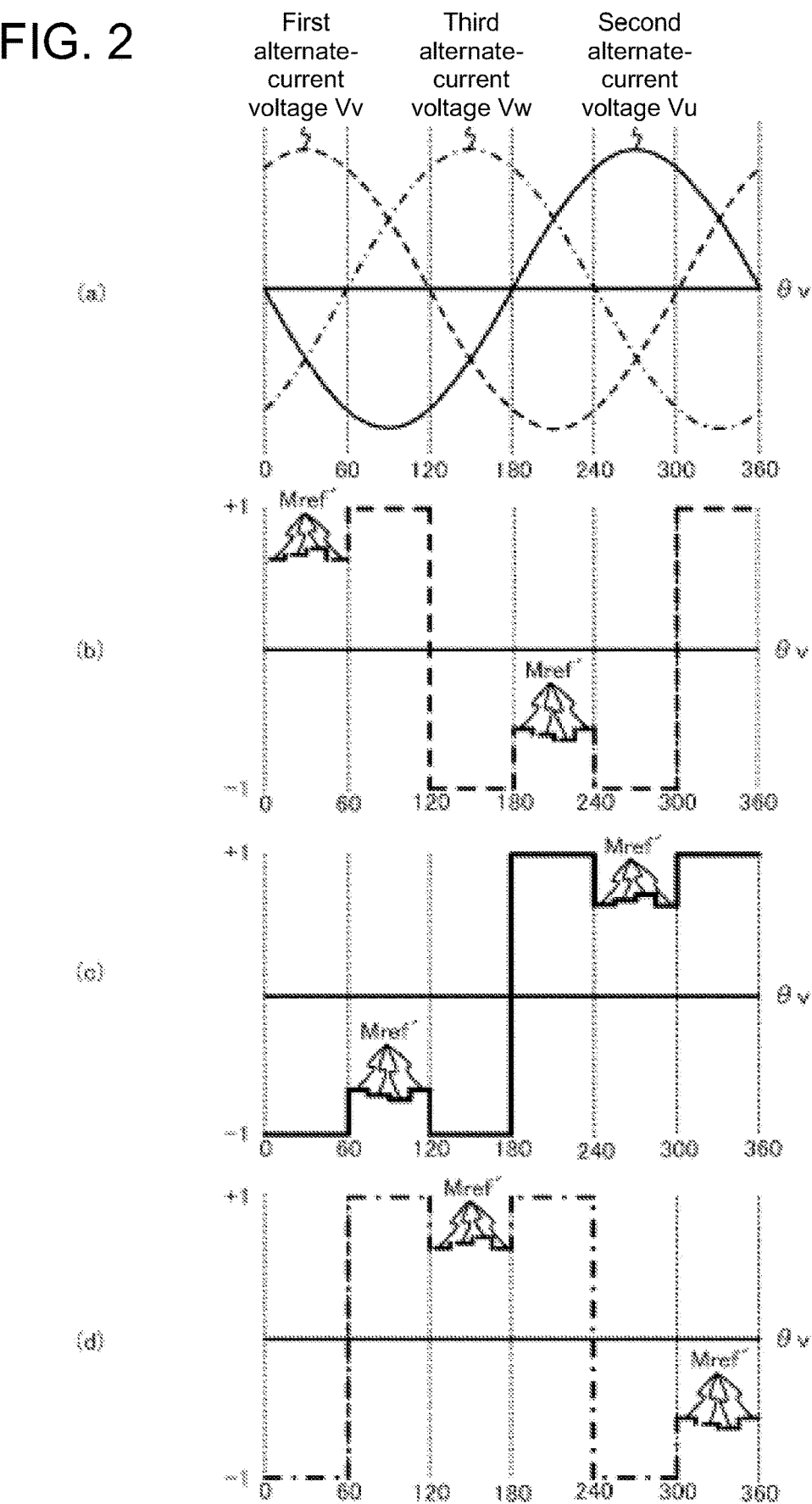
FIG. 2 is a diagram illustrating an example of an alternate-current voltage applied to each phase and a modulated wave corresponding to each phase in one-phase modulation control.

In this regard, FIG. 2 at (a) is a diagram illustrating an example of the second alternate-current voltage Vu applied to the U phase of the electric motor M, the first alternate-current voltage Vv applied to the V phase of the electric motor M, and the third alternate-current voltage Vw applied to the W phase of the electric motor M. In addition, FIG. 2 at (b) is a diagram illustrating an example of the V-phase modulated wave Vv*. In addition, FIG. 2 at (c) is a diagram illustrating an example of the U-phase modulated wave Vu*. In addition, FIG. 2 at (d) is a diagram illustrating an example of the W-phase modulated wave Vw*. It is to be noted that in the two-dimensional coordinates illustrated in FIG. 2 at (a) to (d), the horizontal axis indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage. In addition, the solid line illustrated in FIG. 2 at (a) indicates the alternate-current voltage Vu, the dashed line illustrated in FIG. 2 at (a) indicates the alternate-current voltage Vv, the long dashed short dashed line illustrated in FIG. 2 at (a) indicates the alternate-current voltage Vw, the dashed line illustrated in FIG. 2 at (b) indicates the V-phase modulated wave Vv*, the solid line illustrated in FIG. 2 at (c) indicates the U-phase modulated wave Vu*, and the long dashed short dashed line illustrated in FIG. 2 at (d) indicates the W-phase modulated wave Vw*. It is to be noted that the range of the target electric angle θv from 0 to 360 [deg] is regarded as the control cycle of the electric motor M.

Figure 3:
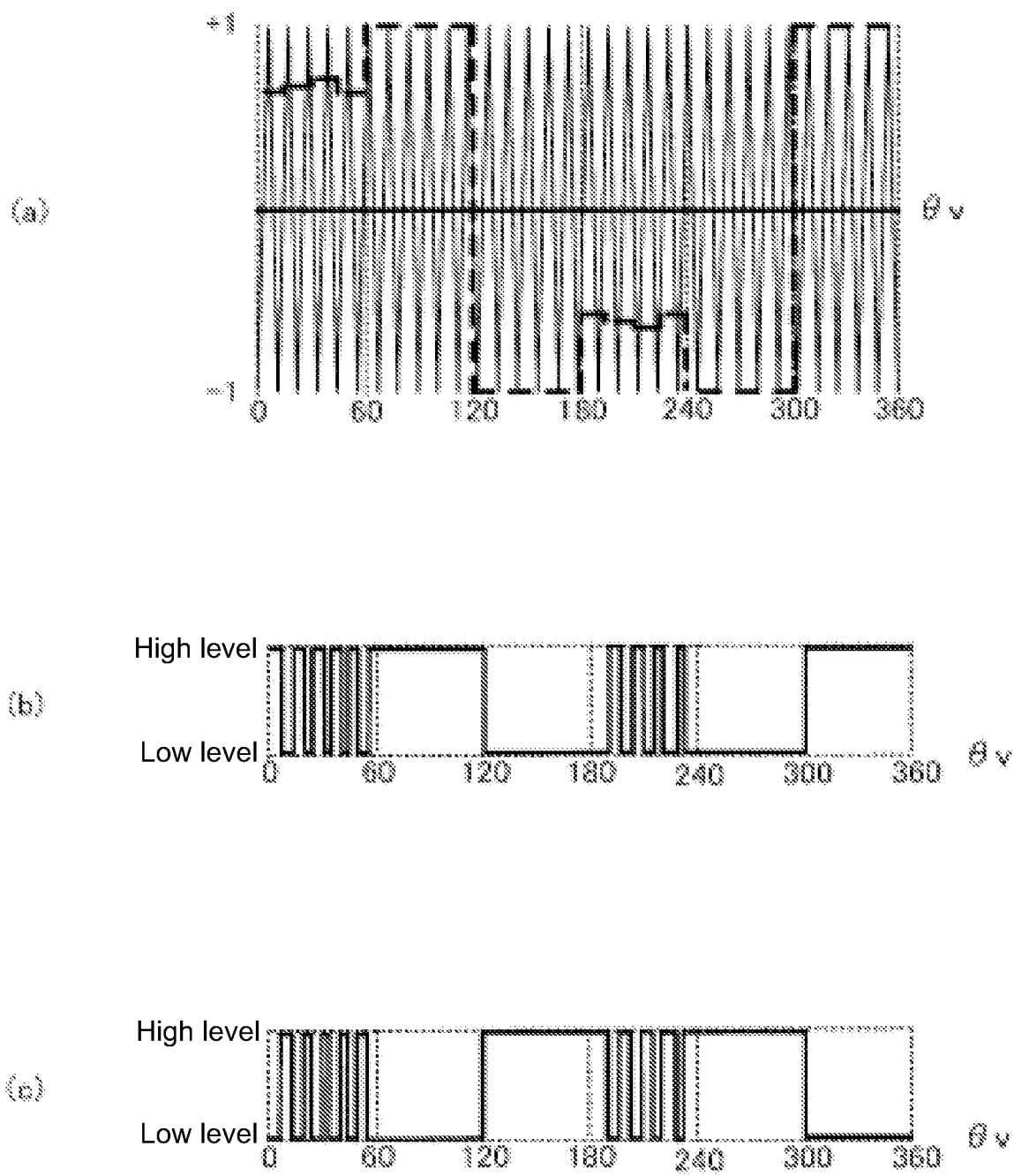
FIG. 3 is a diagram illustrating an example of comparison between a V-phase modulated wave and a carrier wave and a drive signal in one-phase modulation control.

Further, FIG. 3 at (a) is a diagram illustrating an example of the comparison result between the V-phase modulated wave Vv* and the carrier wave. FIG. 3 at (b) is a diagram illustrating an example of the drive signal S3 obtained from the comparison result illustrated in FIG. 3 at (a). FIG. 3 at (c) is a diagram illustrating an example of the drive signal S4 obtained from the comparison result illustrated in FIG. 3 at (a). It is to be noted that in the two-dimensional coordinates illustrated in FIG. 3 at (a) to (c), the horizontal axis indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage.

Figure 4:
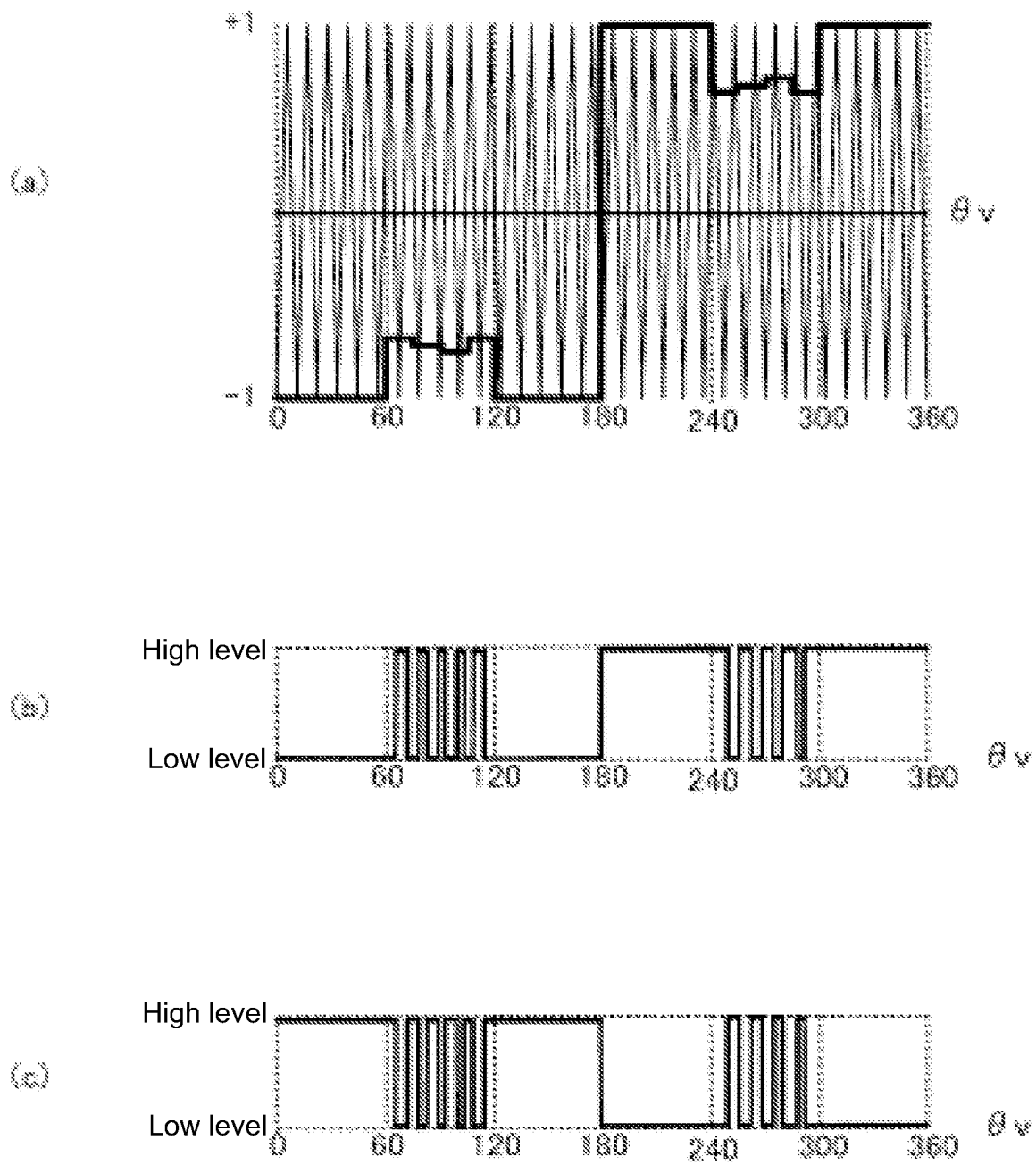
FIG. 4 is a diagram illustrating an example of comparison between a U-phase modulated wave and a carrier wave and a drive signal in one-phase modulation control.

Further, FIG. 4 at (a) is a diagram illustrating an example of the comparison result between the U-phase modulated wave Vu* and the carrier wave. FIG. 4 at (b) is a diagram illustrating an example of the drive signal S1 obtained from the comparison result illustrated in FIG. 4 at (a). FIG. 4 at (c) is a diagram illustrating an example of the drive signal S2 obtained from the comparison result illustrated in FIG. 4 at (a). It is to be noted that in the two-dimensional coordinates illustrated in FIG. 4 at (a) to (c), the horizontal axis indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage.

FIG. 5 at (a) is a diagram illustrating an example of the comparison result between the W-phase modulated wave Vw* and the carrier wave. FIG. 5 at (b) is a diagram illustrating an example of the drive signal S5 obtained from the comparison result illustrated in FIG. 5 at (a). FIG. 5 at (c) is a diagram illustrating an example of the drive signal S6 obtained from the comparison result illustrated in FIG. 5 at (a). It is to be noted that in the two-dimensional coordinates illustrated in FIG. 5 at (a) to (c), the horizontal axis indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage.

The dq/uvw conversion unit 15 generates the V-phase modulated wave Vv* with a modulation factor Mref' (modulation factor Mref' that is less than or equal to the maximum value (+1) of the carrier wave and more than or equal to the minimum value (−1) of the carrier wave) in accordance with the output (rotational speed ω, d-axis current Id, q-axis current Iq) of the electric motor M as illustrated in FIG. 2 at (b) in the first section (0 to 60 [deg]) with the positive peak of the first alternate-current voltage Vv illustrated in FIG. 2 at (a) in the control cycle of the electric motor M. It is to be noted that the modulation factor Mref' will be determined for each calculation cycle T of the calculation unit 5, with −1≤ modulation factor Mref'≤+1 satisfied. In addition, the control cycle of the electric motor M>the calculation cycle T of the calculation unit 5 will be satisfied. In addition, the dq/uvw conversion unit 15 generates, in the first section, the U-phase modulated wave Vu* with the same value as the minimum value of the carrier wave as illustrated in FIG. 2 at (c). In addition, the dq/uvw conversion unit 15 generates, in the first section, the W-phase modulated wave Vw* with the same value as the minimum value of the carrier wave as illustrated in FIG. 2 at (d). Then, in the first section, the drive circuit 4 compares the V-phase modulated wave Vv* that is smaller than the maximum value of the carrier wave and larger than the minimum value of the carrier wave with the carrier wave as illustrated in FIG. 3 at (a), thereby outputting the drive signal S3 repeatedly at the high level and the low level to the gate terminal of the switching element SW3 as illustrated in FIG. 3 at (b), and outputting the drive signal S4 repeatedly at the low level and the high level to the gate terminal of the switching element SW4 as illustrated in FIG. 3 at (c). In addition, in the first section, the drive circuit 4 compares the U-phase modulated wave Vu* that is the minimum value of the carrier wave with the carrier wave as illustrated in FIG. 4 at (a), thereby outputting the drive signal S1 at the low level to the gate terminal of the switching element SW1 as illustrated in FIG. 4 at (b), and outputting the drive signal S2 at the high level to the gate terminal of the switching element SW2 as illustrated in FIG. 4 at (c). In addition, in the first section, the drive circuit 4 compares the W-phase modulated wave Vw* that is the minimum value of the carrier wave with the carrier wave as illustrated in FIG. 5 at (a), thereby outputting the drive signal S5 at the low level to the gate terminal of the switching element SW5 as illustrated in FIG. 5 at (b), and outputting the drive signal SW6 at the high level to the gate terminal of the switching element SW6 as illustrated in FIG. 5 at (c). Thus, in the first section, the switching elements SW3 and SW4 are repeatedly turned on and off, the switching elements SW1 and SW5 are always turned off, and the switching elements SW2 and SW6 are always turned on. More specifically, in the first section, in the case where the modulation factor Mref is smaller than the maximum value of the carrier wave and larger than the minimum value thereof, the electric motor M is driven by the one-phase modulation control.

In addition, the dq/uvw conversion unit 15 generates the U-phase modulated wave Vu* with a modulation factor Mref (modulation factor Mref that is less than or equal to the maximum value of the carrier wave and more than or equal to the minimum value of the carrier wave) in accordance with the output of the electric motor M as illustrated in FIG. 2 at (c) in the second section (60 to 120 [deg]) with the negative peak of the second alternate-current voltage Vu illustrated in FIG. 2 at (a) in the control cycle of the electric motor M. In addition, the dq/uvw conversion unit 15 generates, in the second section, the V-phase modulated wave Vv* with the same value as the maximum value of the carrier wave as illustrated in FIG. 2 at (b). In addition, the dq/uvw conversion unit 15 generates, in the second section, the W-phase modulated wave Vw* with the same value as the maximum value of the carrier wave as illustrated in FIG. 2 at (d). Then, in the second section, the drive circuit 4 compares the U-phase modulated wave Vu* that is smaller than the maximum value of the carrier wave and larger than the minimum value of the carrier wave with the carrier wave as illustrated in FIG. 4 at (a), thereby outputting the drive signal S1 repeatedly at the high level and the low level to the gate terminal of the switching element SW1 as illustrated in FIG. 4 at (b), and outputting the drive signal S2 repeatedly at the low level and the high level to the gate terminal of the switching element SW2 as illustrated in FIG. 4 at (c). In addition, in the second section, the drive circuit 4 compares the V-phase modulated wave Vv* that is the maximum value of the carrier wave with the carrier wave as illustrated in FIG. 3 at (a), thereby outputting the drive signal S3 at the high level to the gate terminal of the switching element SW3 as illustrated in FIG. 3 at (b), and outputting the drive signal S4 at the low level to the gate terminal of the switching element SW4 as illustrated in FIG. 3 at (c). In addition, in the second section, the drive circuit 4 compares the W-phase modulated wave Vw* that is the maximum value of the carrier wave with the carrier wave as illustrated in FIG. 5 at (a), thereby outputting the drive signal S5 at the high level to the gate terminal of the switching element SW5 as illustrated in FIG. 5 at (b), and outputting the drive signal S6 at the low level to the gate terminal of the switching element SW6 as illustrated in FIG. 5 at (c). Thus, in the second section, the switching elements SW1 and SW2 are repeatedly turned on and off, the switching elements SW3 and SW5 are always turned on, and the switching elements SW4 and SW6 are always turned off. More specifically, in the second section, in the case where the modulation factor Mref is smaller than the maximum value of the carrier wave and larger than the minimum value thereof, the electric motor M is driven by the one-phase modulation control.

In addition, the dq/uvw conversion unit 15 generates the W-phase modulated wave Vw* with a modulation factor Mref (modulation factor Mref that is less than or equal to the maximum value of the carrier wave and more than or equal to the minimum value of the carrier wave) in accordance with the output of the electric motor M as illustrated in FIG. 2 at (d) in the third section (120 to 180 [deg]) with the positive peak of the third alternate-current voltage Vw illustrated in FIG. 2 at (a) in the control cycle of the electric motor M. In addition, the dq/uvw conversion unit 15 generates, in the third section, the V-phase modulated wave Vv* with the same value as the minimum value of the carrier wave as illustrated in FIG. 2 at (b). In addition, the dq/uvw conversion unit 15 generates, in the third section, the U-phase modulated wave Vu* with the same value as the minimum value of the carrier wave as illustrated in FIG. 2 at (c). Then, in the third section, the drive circuit 4 compares the W-phase modulated wave Vw* that is smaller than the maximum value of the carrier wave and larger than the minimum value of the carrier wave with the carrier wave as illustrated in FIG. 5 at (a), thereby outputting the drive signal S5 repeatedly at the high level and the low level to the gate terminal of the switching element SW5 as illustrated in FIG. 5 at (b), and outputting the drive signal S6 repeatedly at the low level and the high level to the gate terminal of the switching element SW6 as illustrated in FIG. 5 at (c). In addition, in the third section, the drive circuit 4 compares the V-phase modulated wave Vv* that is the minimum value of the carrier wave with the carrier wave as illustrated in FIG. 3 at (a), thereby outputting the drive signal S3 at the low level to the gate terminal of the switching element SW3 as illustrated in FIG. 3 at (b), and outputting the drive signal S4 at the high level to the gate terminal of the switching element SW4 as illustrated in FIG. 3 at (c). In addition, in the third section, the drive circuit 4 compares the U-phase modulated wave Vu* that is the minimum value of the carrier wave with the carrier wave as illustrated in FIG. 4 at (a), thereby outputting the drive signal S1 at the low level to the gate terminal of the switching element SW1 as illustrated in FIG. 4 at (b), and outputting the drive signal S2 at the high level to the gate terminal of the switching element SW2 as illustrated in FIG. 4 at (c). Thus, in the third section, the switching elements SW5 and SW6 are repeatedly turned on and off, the switching elements SW1 and SW3 are always turned off, and the switching elements SW2 and SW4 are always turned on. More specifically, in the third section, in the case where the modulation factor Mref is smaller than the maximum value of the carrier wave and larger than the minimum value thereof, the electric motor M is driven by the one-phase modulation control.

As described above, in the half cycle (0 to 180 [deg]) of the control cycle of the electric motor M, in the case where the modulation factor Mref is smaller than the maximum value of the carrier wave and larger than the minimum value thereof, the dq/uvw conversion unit 15 drives the electric motor M by the one-phase modulation control. Further, also in the other half cycle (first section (180 to 240 [deg]), second section (240 to 300 [deg]), and third section (300 to 360 [deg])) of the control cycle of the electric motor M, the dq/uvw conversion unit 15 drives the electric motor M by the one-phase modulation control in the case where the modulation factor Mref is smaller than the maximum value of the carrier wave and larger than the minimum value thereof.

Figure 6:
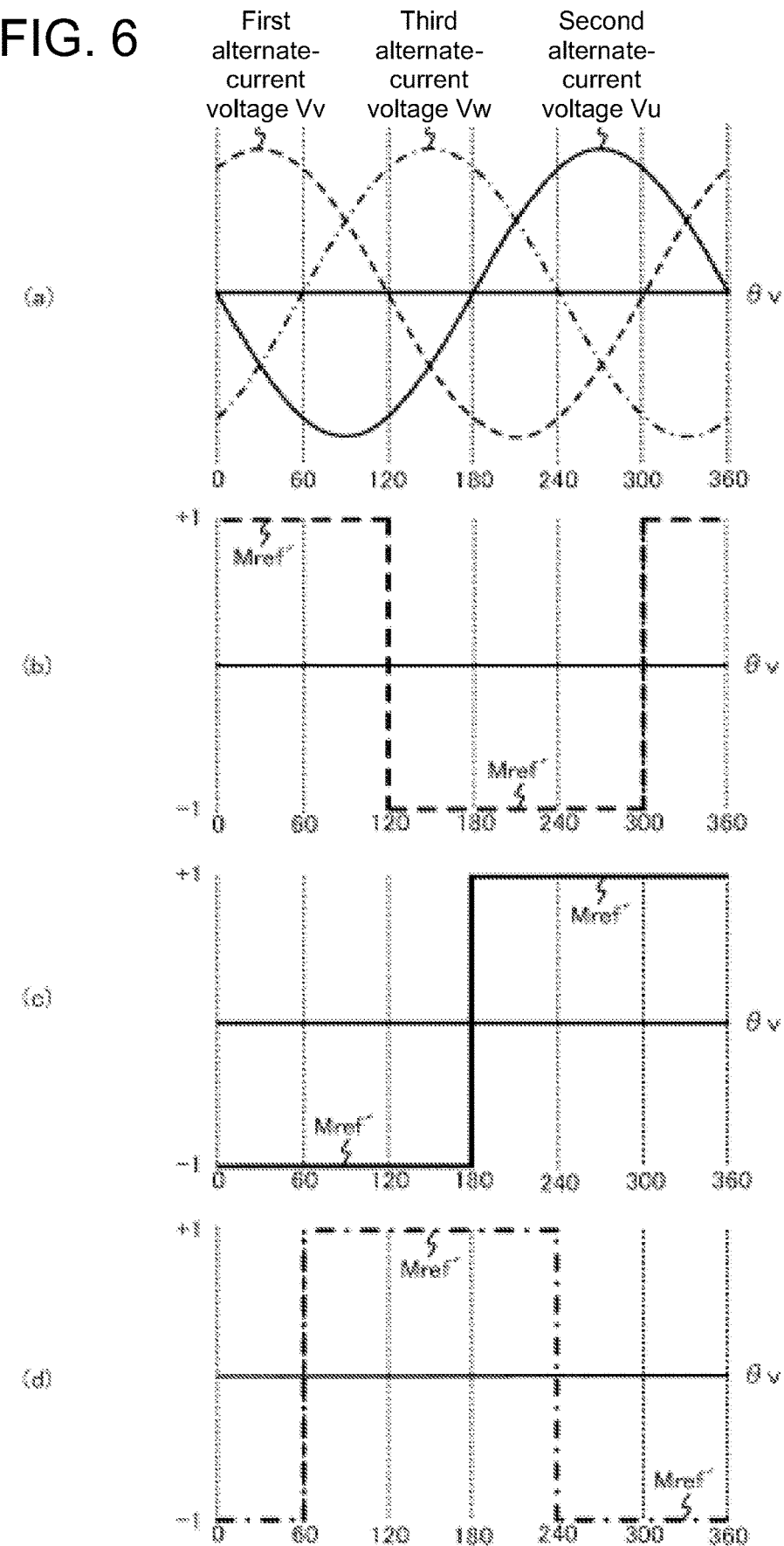
FIG. 6 is a diagram illustrating an example of an alternate-current voltage applied to each phase and a modulated wave corresponding to each phase in rectangular wave control.

FIG. 6 at (a) is a diagram illustrating an example of the second alternate-current voltage Vu, the first alternate-current voltage Vv, and the third alternate-current voltage Vw. In addition, FIG. 6 at (b) is a diagram illustrating an example of the V-phase modulated wave Vv*. In addition, FIG. 6 at (c) is a diagram illustrating an example of the U-phase modulated wave Vu*. In addition, FIG. 6 at (d) is a diagram illustrating an example of the W-phase modulated wave Vw*. It is to be noted that in the two-dimensional coordinates illustrated in FIG. 6 at (a) to (d), the horizontal axis indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage. In addition, the solid line illustrated in FIG. 6 at (a) indicates the alternate-current voltage Vu, the dashed line illustrated in FIG. 6 at (a) indicates the alternate-current voltage Vv, the long dashed short dashed line illustrated in FIG. 6 at (a) indicates the alternate-current voltage Vw, the dashed line illustrated in FIG. 6 at (b) indicates the V-phase modulated wave Vv*, the solid line illustrated in FIG. 6 at (c) indicates the U-phase modulated wave Vu*, and the long dashed short dashed line illustrated in FIG. 6 at (d) indicates the W-phase modulated wave Vw*. It is to be noted that the range of the target electric angle θv from 0 to 360 [deg] is regarded as the control cycle of the electric motor M.

Figure 7:
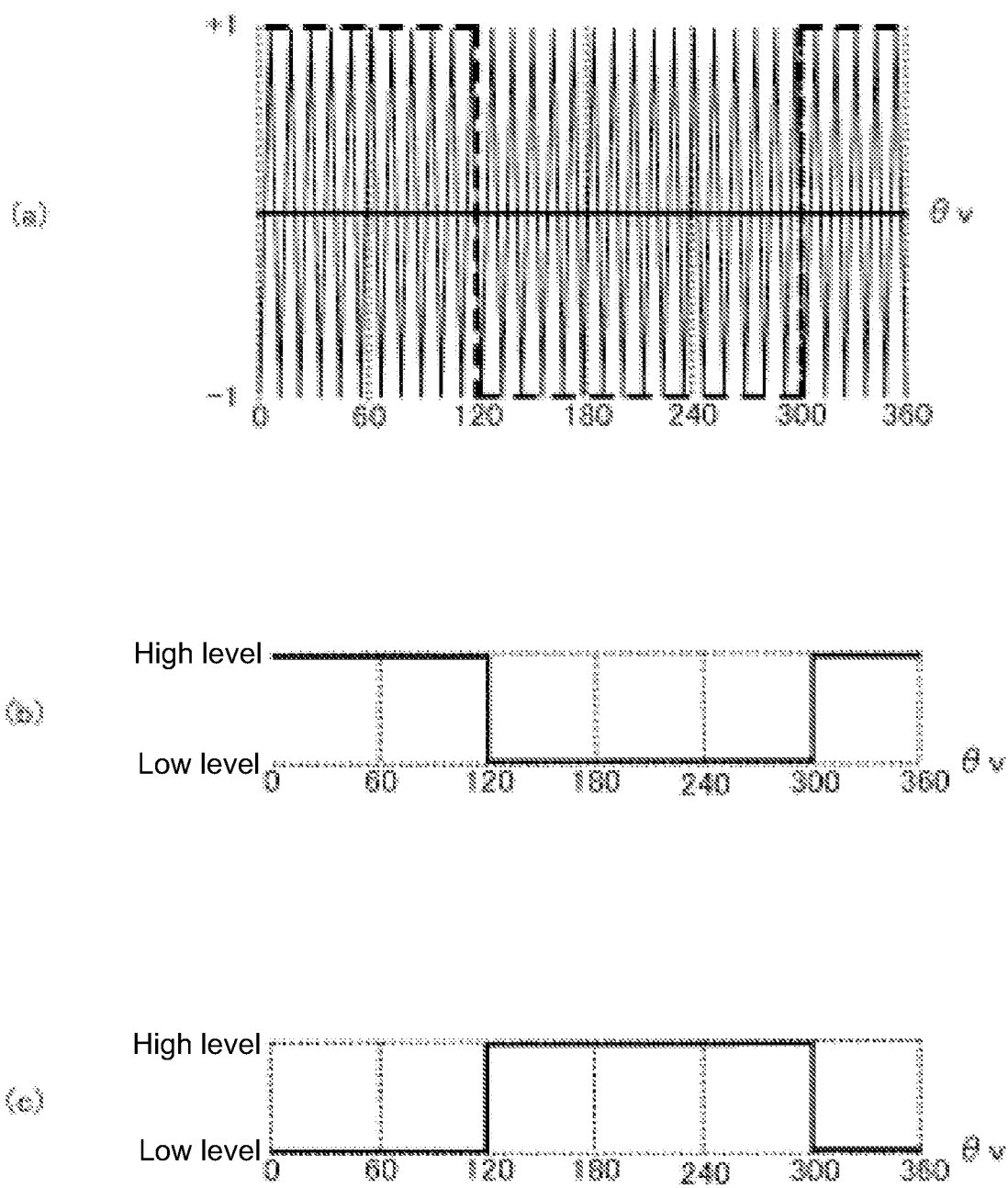
FIG. 7 is a diagram illustrating an example of comparison between a V-phase modulated wave and a carrier wave and a drive signal in rectangular wave control.

Further, FIG. 7 at (a) is a diagram illustrating an example of the comparison result between the V-phase modulated wave Vv* and the carrier wave. FIG. 7 at (b) is a diagram illustrating an example of the drive signal S3 obtained from the comparison result illustrated in FIG. 7 at (a). FIG. 7 at (c) is a diagram illustrating an example of the drive signal S4 obtained from the comparison result illustrated in FIG. 7 at (a). It is to be noted that in the two-dimensional coordinates illustrated in FIG. 7 at (a) to (c), the horizontal axis indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage.

Figure 8:
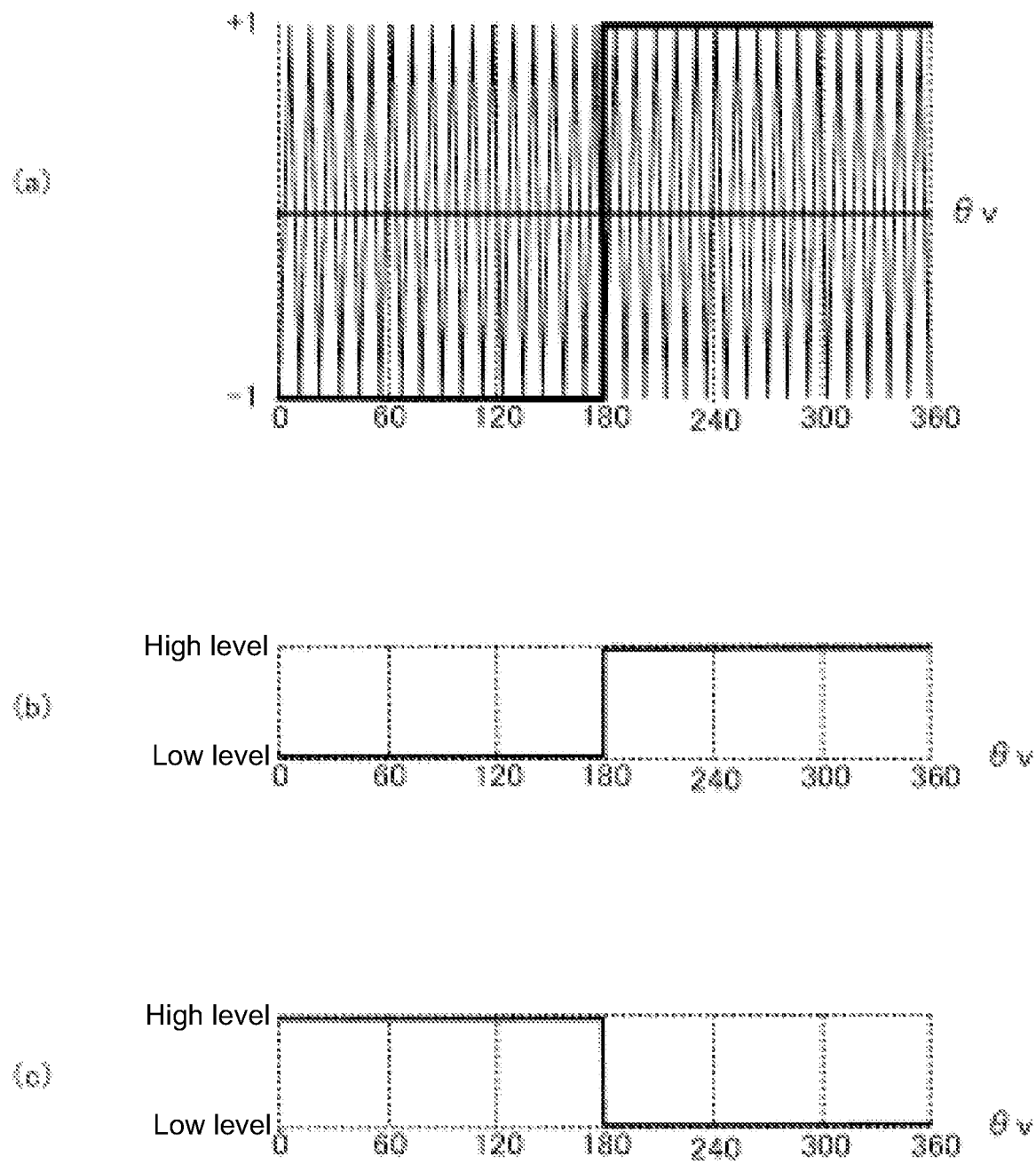
FIG. 8 is a diagram illustrating an example of comparison between a U-phase modulated wave and a carrier wave and a drive signal in rectangular wave control.

Further, FIG. 8 at (a) is a diagram illustrating an example of the comparison result between the U-phase modulated wave Vu* and the carrier wave. FIG. 8 at (b) is a diagram illustrating an example of the drive signal S1 obtained from the comparison result illustrated in FIG. 8 at (a). FIG. 8 at (c) is a diagram illustrating an example of the drive signal S2 obtained from the comparison result illustrated in FIG. 8 at (a). It is to be noted that in the two-dimensional coordinates illustrated in FIG. 8 at (a) to (c), the horizontal axis indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage.

FIG. 9 at (a) is a diagram illustrating an example of the comparison result between the W-phase modulated wave Vw* and the carrier wave. FIG. 9 at (b) is a diagram illustrating an example of the drive signal S5 obtained from the comparison result illustrated in FIG. 9 at (a). FIG. 9 at (c) is a diagram illustrating an example of the drive signal S6 obtained from the comparison result illustrated in FIG. 9 at (a). It is to be noted that in the two-dimensional coordinates illustrated in FIG. 9 at (a) to (c), the horizontal axis indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage.

The dq/uvw conversion unit 15 generates the V-phase modulated wave Vv* with a modulation factor Mref (the maximum value (+1) of the carrier wave) in accordance with the output of the electric motor M as illustrated in FIG. 6 at (b) in the first section (0 to 60 [deg]) with the positive peak of the first alternate-current voltage Vv illustrated in FIG. 6 at (a) in the control cycle of the electric motor M. In addition, the dq/uvw conversion unit 15 generates, in the first section, the U-phase modulated wave Vu* with the same value as the minimum value (−1) of the carrier wave as illustrated in FIG. 6 at (c). In addition, the dq/uvw conversion unit 15 generates, in the first section, the W-phase modulated wave Vw* with the same value as the minimum value of the carrier wave as illustrated in FIG. 6 at (d). Then, in the first section, the drive circuit 4 compares the V-phase modulated wave Vv* that is the maximum value of the carrier wave with the carrier wave as illustrated in FIG. 7 at (a), thereby outputting the drive signal S3 at the high level to the gate terminal of the switching element SW3 as illustrated in FIG. 7 at (b), and outputting the drive signal S4 at the low level to the gate terminal of the switching element SW4 as illustrated in FIG. 7 at (c). In addition, in the first section, the drive circuit 4 compares the U-phase modulated wave Vu* that is the minimum value of the carrier wave with the carrier wave as illustrated in FIG. 8 at (a), thereby outputting the drive signal S1 at the low level to the gate terminal of the switching element SW1 as illustrated in FIG. 8 at (b), and outputting the drive signal S2 at the high level to the gate terminal of the switching element SW2 as illustrated in FIG. 8 at (c). In addition, in the first section, the drive circuit 4 compares the W-phase modulated wave Vw* that is the minimum value of the carrier wave with the carrier wave as illustrated in FIG. 9 at (a), thereby outputting the drive signal S5 at the low level to the gate terminal of the switching element SW5 as illustrated in FIG. 9 at (b), and outputting the drive signal SW6 at the high level to the gate terminal of the switching element SW6 as illustrated in FIG. 9 at (c). Thus, in the first section, the switching elements SW2, SW3, and SW6 are always turned on, and the switching elements SW1, SW4, and SW5 are always turned off. More specifically, in the first section, in the case where the modulation factor Mref is the maximum value of the carrier wave, the electric motor M is driven by the rectangular wave control.

In addition, the dq/uvw conversion unit 15 generates the U-phase modulated wave Vu* with a modulation factor Mref' (the minimum value of the carrier wave) in accordance with the output of the electric motor M as illustrated in FIG. 6 at (c) in the second section (60 to 120 [deg]) with the negative peak of the second alternate-current voltage Vu illustrated in FIG. 6 at (a) in the control cycle of the electric motor M. In addition, the dq/uvw conversion unit 15 generates, in the second section, the V-phase modulated wave Vv* with the same value as the maximum value of the carrier wave as illustrated in FIG. 6 at (b). In addition, the dq/uvw conversion unit 15 generates, in the second section, the W-phase modulated wave Vw* with the same value as the maximum value of the carrier wave as illustrated in FIG. 6 at (d). Then, in the second section, the drive circuit 4 compares the U-phase modulated wave Vu* that is the minimum value of the carrier wave with the carrier wave as illustrated in FIG. 8 at (a), thereby outputting the drive signal S1 at the low level to the gate terminal of the switching element SW1 as illustrated in FIG. 8 at (b), and outputting the drive signal S2 at the high level to the gate terminal of the switching element SW2 as illustrated in FIG. 8 at (c). In addition, in the second section, the drive circuit 4 compares the V-phase modulated wave Vv* that is the maximum value of the carrier wave with the carrier wave as illustrated in FIG. 7 at (a), thereby outputting the drive signal S3 at the high level to the gate terminal of the switching element SW3 as illustrated in FIG. 7 at (b), and outputting the drive signal S4 at the low level to the gate terminal of the switching element SW4 as illustrated in FIG. 7 at (c). In addition, in the second section, the drive circuit 4 compares the W-phase modulated wave Vw* that is the maximum value of the carrier wave with the carrier wave as illustrated in FIG. 9 at (a), thereby outputting the drive signal S5 at the high level to the gate terminal of the switching element SW5 as illustrated in FIG. 9 at (b), and outputting the drive signal S6 at the low level to the gate terminal of the switching element SW6 as illustrated in FIG. 9 at (c). Thus, in the second section, the switching elements SW2, SW3, and SW5 are always turned on, and the switching elements SW1, SW4, and SW6 are always turned off. More specifically, in the second section, in the case where the modulation factor Mref' is the minimum value of the carrier wave, the electric motor M is driven by the rectangular wave control.

In addition, the dq/uvw conversion unit 15 generates the W-phase modulated wave Vw* with a modulation factor Mref (the maximum value of the carrier wave) in accordance with the output of the electric motor M as illustrated in FIG. 6 at (d) in the third section (120 to 180 [deg]) with the positive peak of the third alternate-current voltage Vw illustrated in FIG. 6 at (a) in the control cycle of the electric motor M. In addition, the dq/uvw conversion unit 15 generates, in the third section, the V-phase modulated wave Vv* with the same value as the minimum value of the carrier wave as illustrated in FIG. 6 at (b). In addition, the dq/uvw conversion unit 15 generates, in the third section, the U-phase modulated wave Vu* with the same value as the minimum value of the carrier wave as illustrated in FIG. 6 at (c). Then, in the third section, the drive circuit 4 compares the W-phase modulated wave Vw* that is the maximum value of the carrier wave with the carrier wave as illustrated in FIG. 9 at (a), thereby outputting the drive signal S5 at the high level to the gate terminal of the switching element SW5 as illustrated in FIG. 9 at (b), and outputting the drive signal S6 at the low level to the gate terminal of the switching element SW6 as illustrated in FIG. 9 at (c). In addition, in the third section, the drive circuit 4 compares the V-phase modulated wave Vv* that is the minimum value of the carrier wave with the carrier wave as illustrated in FIG. 7 at (a), thereby outputting the drive signal S3 at the low level to the gate terminal of the switching element SW3 as illustrated in FIG. 7 at (b), and outputting the drive signal S4 at the high level to the gate terminal of the switching element SW4 as illustrated in FIG. 7 at (c). In addition, in the third section, the drive circuit 4 compares the U-phase modulated wave Vu* that is the minimum value of the carrier wave with the carrier wave as illustrated in FIG. 8 at (a), thereby outputting the drive signal S1 at the low level to the gate terminal of the switching element SW1 as illustrated in FIG. 8 at (b), and outputting the drive signal S2 at the high level to the gate terminal of the switching element SW2 as illustrated in FIG. 8 at (c). Thus, in the third section, the switching elements SW2, SW4, and SW5 are always turned on, and the switching elements SW1, SW3, and SW6 are always turned off. More specifically, in the third section, in the case where the modulation factor Mref' is the maximum value of the carrier wave, the electric motor M is driven by the rectangular wave control.

As described above, in the half cycle (0 to 180 [deg]) of the control cycle of the electric motor M, in the case where the modulation factor Mref' is the maximum value of the carrier wave or the case where the modulation factor Mref' is the minimum value of the carrier wave, the dq/uvw conversion unit 15 drives the electric motor M by the rectangular wave control. Further, also in the other half cycle (first section (180 to 240 [deg]), second section (240 to 300 [deg]), and third section (300 to 360 [deg])) of the control cycle of the electric motor M, the dq/uvw conversion unit 15 drives the electric motor M by the rectangular wave control in the case where the modulation factor Mref' is the maximum value of the carrier wave or the case where the modulation factor Mref' is the minimum value of the carrier wave.

As described above, the control device 1 of the electric motor M according to the embodiment outputs the V-phase modulated wave Vv* in accordance with the output of the electric motor M and outputs the minimum value or maximum value of the carrier wave as the U-phase modulated wave Vu* and the W-phase modulated wave Vw* in the first section with the peak of the first alternate-current voltage Vv in the control cycle of the electric motor M, outputs the U-phase modulated wave Vu* in accordance with the output of the electric motor M and outputs the minimum value or maximum value of the carrier wave as the V-phase modulated wave Vv* and the W-phase modulated wave Vw* in the second section with the peak of the second alternate-current voltage Vu*, and outputs the W-phase modulated wave Vw* in accordance with the output of the electric motor M and outputs the minimum value or maximum value of the carrier wave as the V-phase modulated wave Vv* and the U-phase modulated wave Vu* in the third section with the peak of the third alternate-current voltage Vw.

Thus, in the control cycle (first to third sections) of the electric motor M, in the case where the V-phase modulated wave Vv*, the U-phase modulated wave Vu*, and the W-phase modulated wave Vw* in accordance with the output of the electric motor M are smaller than the maximum value of the carrier wave and larger than the minimum value of the carrier wave, the switching elements in one phase among the switching elements in the three phases may be repeatedly turned on and off, that is, the one-phase modulation control may be performed. In addition, in the control cycle of the electric motor M, in the case where the V-phase modulated wave Vv*, the U-phase modulated wave Vu*, and the W-phase modulated wave Vw* in accordance with the output of the electric motor M are the minimum value or maximum value of the carrier wave, each of the switching elements in the three phases may be always turned on or off, that is, the rectangular wave control may be performed. In addition, in the control cycle of the electric motor M, the switching elements may be turned on and off at duty ratios in accordance with the V-phase modulated wave Vv*, the U-phase modulated wave Vu*, and the W-phase modulated wave Vw*, and the ON times of the switching elements may be gradually changed in accordance with the output of the electric motor M. Thus, even if the increased output of the electric motor M makes a transition from the one-phase modulation control to the rectangular wave control, the ON times of the switching elements may be seamlessly changed, and accordingly, distortion of the current flowing through the electric motor M may be suppressed, and fluctuation of the torque may be suppressed. In addition, the phase in which the switching elements are switched has only to be switched for each of the first to third sections, without any complicated calculation required, and the calculation load of the control device 1 may be thus reduced.

In addition, the control device 1 of the electric motor M according to the embodiment may increase the switching frequencies of the switching elements SW1 to SW6 as compared with control devices of electric motors that perform three-phase modulation control or two-phase modulation control, and thus may shift the switching frequencies to the outside of the audible range, and may achieve noise reduction.

Figures 10A, 10B:
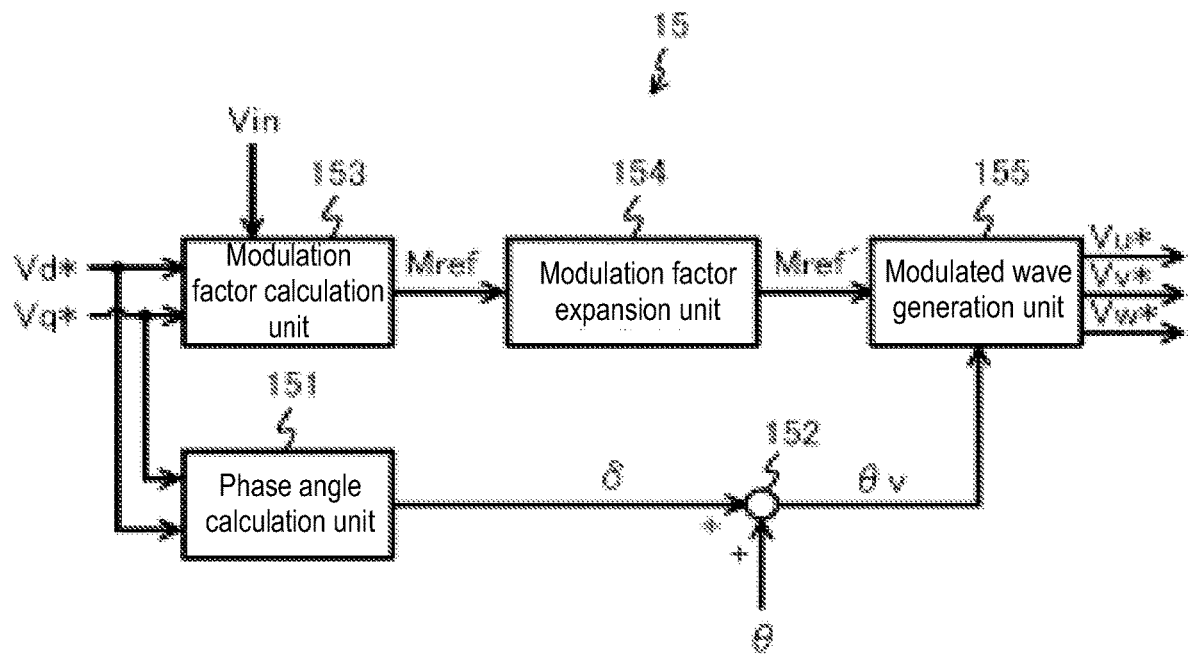
FIG. 10A is a diagram illustrating an example of a dq/uvw conversion unit.
FIG. 10B is a diagram illustrating an example of information.

FIG. 10A is a diagram illustrating an example of the dq/uvw conversion unit 15.

The dq/uvw conversion unit 15 illustrated in FIG. 10A includes a phase angle calculation unit 151, an addition unit 152, a modulation factor calculation unit 153, a modulation factor expansion unit 154, and a modulated wave generation unit 155.

The phase angle calculation unit 151 calculates a phase angle δ corresponding to the d-axis voltage command value Vd* and q-axis voltage command value Vq* output from the current control unit 14. For example, the phase angle calculation unit 151 determines the calculation result of the following formula 3 as the phase angle δ.

[Mathematical Formula 1]

$$\delta = \tan^{-1}\left(-\frac{Vq*}{Vd*}\right) \qquad \text{Formula 3}$$

The addition unit 152 determines the result of adding the phase angle δ output from the phase angle calculation unit 151 and the electric angle θ output from the electric angle detection unit Sp as the target electric angle θv. It is to be noted that the phase angle calculation unit 151 and the addition unit 152 constitute a target electric angle calculation unit. More specifically, the target electric angle calculation unit calculates the target electric angle θv from the d-axis voltage command value Vd* and the q-axis voltage command value Vq* in accordance with the output of the electric motor M and the electric angle θ detected by the electric angle detection unit Sp.

The modulation factor calculation unit 153 calculates the modulation factor Mref with the use of the input voltage Vin detected by the voltage sensor Sv and the d-axis voltage command value Vd* and q-axis voltage command value Vq* output from current control unit 14. For example, the modulation factor calculation unit 153 determines the calculation result of the following formula 4 as the modulation factor Mref. It is to be noted that 0≤Mref≤1 is satisfied.

[Mathematical Formula 2]

$$Mref = \frac{\pi \times \sqrt{Vd^{*2} + Vq^{*2}}}{\sqrt{6} \times V_{in}} \qquad \text{Formula 4}$$

The modulation factor expansion unit 154 expands the modulation factor Mref output from the modulation factor calculation unit 153 to determine the modulation factor Mref'. For example, the modulation factor expansion unit 154 determines the calculation result of the following formula 5 as the modulation factor Mref'. It is to be noted that −1≤Mref'≤+1 is satisfied.

$$Mref'=2\times Mref-1 \qquad \text{Formula 5}$$

The modulated wave generation unit 155 generates the U-phase modulated wave Vu*, the V-phase modulated wave Vv*, and the W-phase modulated wave Vw* with the use of the target electric angle θv output from the addition unit 152 and modulation factor Mref' output from the modulation factor expansion unit 154. For example, the modulated wave generation unit 155 refers to the information D1 stored in the storage unit 6 to determine the U-phase modulated wave Vu*, the V-phase modulated wave Vv*, and the W-phase modulated wave Vw* corresponding to the target electric angle θv output from the addition unit 152.

FIG. 10B is a diagram illustrating an example of the information D1.

In the information D1 illustrated in FIG. 10B, "0 to 60 [deg]" that is the first section, "−1 (the minimum value of the carrier wave)" that is the U-phase modulated wave Vu*, "Mref'" that is the V-phase modulated wave Vv*, and "−1" that is the W-phase modulated wave Vw* are associated with each other. In addition, "60 to 120 [deg]" that is the second section, "Mref'" that is the U-phase modulated wave Vu*, "+1 (the maximum value of the carrier wave)" that is the V-phase modulated wave Vv*, and "+1" that is the W-phase modulated wave Vw* are associated with each other. In addition, "120 to 180 [deg]" that is the third section, "−1" that is the U-phase modulated wave Vu*, "−1" that is the V-phase modulated wave Vv*, and "Mref'" that is the W-phase modulated wave Vw* are associated with each other. In addition, "180 to 240 [deg]" that is the first section, "+1" that is the U-phase modulated wave Vu*, "Mref'" that is the V-phase modulated wave Vv*, and "+1" that is the W-phase modulated wave Vw* are associated with each other. In addition, "240 to 300 [deg]" that is the second section, "Mref'" that is the U-phase modulated wave Vu*, "−1" that is the V-phase modulated wave Vv*, and −1" that is the W-phase modulated wave Vw* are associated with each other. In addition, "300 to 360 [deg]" that is the third section, "+1" that is the U-phase modulated wave Vu*, "+1" that is the V-phase modulated wave Vv*, and "Mref'" that is the W-phase modulated wave Vw* are associated with each other.

For example, in the case of the target electric angle θv (54 [deg]) within the first section (0 to 60 [deg]), the modulated wave generation unit 155 outputs "−1" as the U-phase modulated wave Vu*, outputs "Mref'" as the V-phase modulated wave Vv*, and outputs "−1" as the W-phase modulated wave Vw*. Thus, in the case where Mref' is smaller than the maximum value of the carrier wave and larger than the minimum value of the carrier wave, in the first section, the switching elements SW3 and SW4 are repeatedly turned on and off, the switching element SW1 is always turned off, the switching element SW2 is always turned on, the switching element SW5 is always turned off, and the switching element SW6 is always turned on. In addition, in a case of Mref' is the maximum value of the carrier wave, in the first section, the switching element SW3 is always turned on, the switching element SW4 is always turned off, the switching element SW1 is always turned off, the switching element SW2 is always turned on, the switching element SW5 is always turned off, and the switching element SW6 is always turned on.

In addition, in the case of the target electric angle θv (108 [deg]) within the second section (60 to 120 [deg]), the modulated wave generation unit 155 outputs "Mref'" as the U-phase modulated wave Vu*, outputs "+1" as the V-phase modulated wave Vv*, and outputs "+1" as the W-phase modulated wave Vw*. Thus, in the case where Mref' is smaller than the maximum value of the carrier wave and larger than the minimum value of the carrier wave, in the second section, the switching elements SW1 and SW2 are repeatedly turned on and off, the switching element SW3 is always turned on, the switching element SW4 is always turned off, the switching element SW5 is always turned on, and the switching element SW6 is always turned off. In addition, in a case of Mref' is the minimum value of the carrier wave, in the second section, the switching element SW1 is always turned off, the switching element SW2 is always turned on, the switching element SW3 is always turned on, the switching element SW4 is always turned off, the switching element SW5 is always turned on, and the switching element SW6 is always turned off.

In addition, in the case of the target electric angle θv (162 [deg]) within the third section (120 to 180 [deg]), the modulated wave generation unit 155 outputs "−1" as the U-phase modulated wave Vu*, outputs "−1" as the V-phase modulated wave Vv*, and outputs "Mref'" as the W-phase modulated wave Vw*. Thus, in the case where Mref' is smaller than the maximum value of the carrier wave and larger than the minimum value of the carrier wave, in the third section, the switching elements SW5 and SW6 are repeatedly turned on and off, the switching element SW3 is always turned off, the switching element SW4 is always turned on, the switching element SW1 is always turned off, and the switching element SW2 is always turned on. In addition, in a case of Mref' is the maximum value of the carrier wave, in the third section, the switching element SW5 is always turned on, the switching element SW6 is always turned off, the switching element SW3 is always turned off, the switching element SW4 is always turned on, the switching element SW1 is always turned off, and the switching element SW2 is always turned on.

More specifically, the dq/uvw conversion unit 15 illustrated in FIG. 10A may output the modulation factor Mref' in accordance with the output of the electric motor M as the V-phase modulated wave Vv* and output the minimum value or maximum value of the carrier wave as the U-phase modulated wave Vu* and the W-phase modulated wave Vw* in the first section, output the modulation factor Mref' in accordance with the output of the electric motor M as the U-phase modulated wave Vu* and output the minimum value or maximum value of the carrier wave as the V-phase modulated wave Vv* and the W-phase modulated wave Vw* in the second section, and output the modulation factor Mref' in accordance with the output of the electric motor M as the W-phase modulated wave Vw* and output the minimum value or maximum value of the carrier wave as the V-phase modulated wave Vv* and the U-phase modulated wave Vu* in the third section.

FIG. 11A is a diagram illustrating another example of the dq/uvw conversion unit 15.

The dq/uvw conversion unit 15 illustrated in FIG. 11A includes a two-phase/three-phase conversion unit 156 and a modulated wave generation unit 157.

With the use of the electric angle θ output from the electric angle detection unit Sp, the two-phase/three-phase conversion unit 156 (voltage command value calculation unit) converts the d-axis voltage command value Vd* and q-axis voltage command value Vq* in accordance with the output of the electric motor M, output from the current control unit 14, to a U-phase voltage command value Vu (second voltage command value) corresponding to the second alternate-current voltage Vu, a V-phase voltage command value Vv (first voltage command value) corresponding to the first alternate-current voltage Vv, and a W-phase voltage command value Vw** (third voltage command value) corresponding to the third alternate-current voltage Vw. For example, the two-phase/three-phase conversion unit 156 converts the d-axis voltage command value Vd* and the q-axis voltage command value Vq* to the U-phase voltage command value Vu, the V-phase voltage command value Vv, and the W-phase voltage command value Vw** with the use of the transformation matrix C expressed by the following formula 6.

[Mathematical Formula 3]

$$C = \sqrt{\frac{2}{3}} \begin{bmatrix} \cos\theta & \cos(\theta - 2\pi/3) & \cos(\theta + 2\pi/3) \\ -\sin\theta & -\sin(\theta - 2\pi/3) & -\sin(\theta + 2\pi/3) \end{bmatrix} \quad \text{Formula 6}$$

The modulated wave generation unit 157 calculates the U-phase modulated wave Vu*, the V-phase modulated wave Vv*, and the W-phase modulated wave Vw* with the use of the input voltage Vin detected by the voltage sensor Sv, the d-axis voltage command value Vd* and q-axis voltage command value Vq* output from the current control unit 14, and the U-phase voltage command value Vu, V-phase voltage command value Vv, and W-phase voltage command value Vw** output from two-phase/three-phase conversion unit 156. For example, the modulated wave generation unit 157 calculates the above-mentioned formula 3 to determine the phase angle δ, determines, as the target electric angle θv, the result of adding the phase angle δ and the electric angle θ output from the electric angle detection unit Sp, calculates the above-mentioned formula 4 to determine the modulation factor Mref, and calculates the above-mentioned formula 5 to determine the modulation factor Mref'. In addition, the modulated wave generation unit 157 refers to the information D2 stored in the storage unit 6 to determine the U-phase modulated wave Vu*, V-phase modulated wave Vv*, and W-phase modulated wave Vw* corresponding to the branching conditions obtained from the U-phase voltage command value Vu, V-phase voltage command value Vv, and W-phase voltage command value Vw** output from the two-phase/three-phase conversion unit 156.

FIG. 11B is a diagram illustrating an example of the information D2.

In the information D2 illustrated in FIG. 11B, the branching condition of "the case where the absolute value of the V-phase voltage command value Vv is larger than the absolute value of the U-phase voltage command value Vu and the absolute value of the W-phase voltage command value Vw and the case where the V-phase voltage command value Vv is zero or larger", "−1 (the minimum value of the carrier wave)" that is the U-phase modulated wave Vu*, "Mref'" that is the V-phase modulated wave Vv*, and "−1" that is the W-phase modulated wave Vw* are associated with each other. In addition, the branching condition of "the case where the absolute value of the U-phase voltage command value Vu is larger than the absolute value of the V-phase voltage command value Vv and the absolute value of the W-phase voltage command value Vw and the case where the U-phase voltage command value Vu is zero or larger", "Mref'" that is the U-phase modulated wave Vu*, "+1 (the maximum value of the carrier wave)" that is the V-phase modulated wave Vv*, and "+1" that is the W-phase modulated wave Vw* are associated with each other. In addition, the branching condition of "the case where the absolute value of the W-phase voltage command value Vw is larger than the absolute value of the V-phase voltage command value Vv and the absolute value of the U-phase voltage command value Vu and the case where the W-phase voltage command value Vw is zero or larger", "−1" that is the U-phase modulated wave Vu*, "−1" that is the V-phase modulated wave Vv*, and "Mref'" that is the W-phase modulated wave Vw* are associated with each other. In addition, the branching condition of "the case where the absolute value of the V-phase voltage command value Vv is larger than the absolute value of the U-phase voltage command value Vu and the absolute value of the W-phase voltage command value Vw and the case where the V-phase voltage command value Vv is smaller than zero", "+1" that is the U-phase modulated wave Vu*, "Mref'" that is the V-phase modulated wave Vv*, and "+1'" that is the W-phase modulated wave Vw* are associated with each other. In addition, the branching condition of "the case where the absolute value of the U-phase voltage command value Vu is larger than the absolute value of the V-phase voltage command value Vv and the absolute value of the W-phase voltage command value Vw and the case where the U-phase voltage command value Vu is smaller than zero", "Mref'" that is the U-phase modulated wave Vu*, "−1" that is the V-phase modulated wave Vv*, and "−1'" that is the W-phase modulated wave Vw* are associated with each other. In addition, the branching condition of "the case where the absolute value of the W-phase voltage command value Vw is larger than the absolute value of the V-phase voltage command value Vv and the absolute value of the U-phase voltage command value Vu and the case where the W-phase voltage command value Vw is smaller than zero", "+1" that is the U-phase modulated wave Vu*, "+1" that is the V-phase modulated wave Vv*, and "Mref'" that is the W-phase modulated wave Vw* are associated with each other.

For example, in the case where the absolute value of the V-phase voltage command value Vv is larger than the absolute value of the U-phase voltage command value Vu and the absolute value of the W-phase voltage command value Vw, and the case where the V-phase voltage command value Vv is zero or larger, that is, in the case of the target electric angle θv within the first section (0 to 60 [deg]), the modulated wave generation unit 157 outputs "−1" as the U-phase modulated wave Vu*, outputs "Mref'" as the V-phase modulated wave Vv*, and outputs "−1" as the W-phase modulated wave Vw*. Thus, in the case where Mref' is smaller than the maximum value of the carrier wave and larger than the minimum value of the carrier wave, in the first section, the switching elements SW3 and SW4 are repeatedly turned on and off, the switching element SW1 is always turned off, the switching element SW2 is always turned on, the switching element SW5 is always turned off, and the switching element SW6 is always turned on. In addition, in a case of Mref' is the maximum value of the carrier wave, in the first section, the switching element SW3 is always turned on, the switching element SW4 is always turned off, the switching element SW1 is always turned off, the switching element SW2 is always turned on, the switching element SW5 is always turned off, and the switching element SW6 is always turned on.

In addition, in the case where the absolute value of the U-phase voltage command value Vu is larger than the absolute value of the V-phase voltage command value Vv and the absolute value of the W-phase voltage command value Vw, and the case where the U-phase voltage command value Vu is zero or larger, that is, in the case of the target electric angle θv within the second section (60 to 120 [deg]), the modulated wave generation unit 157 outputs "Mref'" as the U-phase modulated wave Vu*, outputs "+1" as the V-phase modulated wave Vv*, and outputs "+1" as the W-phase modulated wave Vw*. Thus, in the case where Mref' is smaller than the maximum value of the carrier wave and larger than the minimum value of the carrier wave, in the second section, the switching elements SW1 and SW2 are repeatedly turned on and off, the switching element SW3 is always turned on, the switching element SW4 is always turned off, the switching element SW5 is always turned on, and the switching element SW6 is always turned off. In addition, in a case of Mref' is the minimum value of the carrier wave, in the second section, the switching element SW1 is always turned off, the switching element SW2 is always turned on, the switching element SW3 is always turned on, the switching element SW4 is always turned off, the switching element SW5 is always turned on, and the switching element SW6 is always turned off.

In addition, in the case where the absolute value of the W-phase voltage command value Vw is larger than the absolute value of the V-phase voltage command value Vv and the absolute value of the U-phase voltage command value Vu, and the case where the W-phase voltage command value Vw is zero or larger, that is, in the case of the target electric angle θv within the third section (120 to 180 [deg]), the modulated wave generation unit 157 outputs "−1" as the U-phase modulated wave Vu*, outputs "−1" as the V-phase modulated wave Vv*, and outputs "Mref'" as the W-phase modulated wave Vw*. Thus, in the case where Mref' is smaller than the maximum value of the carrier wave and larger than the minimum value of the carrier wave, in the third section, the switching elements SW5 and SW6 are repeatedly turned on and off, the switching element SW3 is always turned off, the switching element SW4 is always turned on, the switching element SW1 is always turned off, and the switching element SW2 is always turned on. In addition, in a case of Mref' is the maximum value of the carrier wave, in the third section, the switching element SW5 is always turned on, the switching element SW6 is always turned off, the switching element SW3 is always turned off, the switching element SW4 is always turned on, the switching element SW1 is always turned off, and the switching element SW2 is always turned on.

More specifically, the dq/uvw conversion unit 15 illustrated in FIG. 11A may output the modulation factor Mref' in accordance with the output of the electric motor M as the V-phase modulated wave Vv* and output the minimum value or maximum value of the carrier wave as the U-phase modulated wave Vu* and the W-phase modulated wave Vw* in the first section, output the modulation factor Mref' in accordance with the output of the electric motor M as the U-phase modulated wave Vu* and output the minimum value or maximum value of the carrier wave as the V-phase modulated wave Vv* and the W-phase modulated wave Vw* in the second section, and output the modulation factor Mref' in accordance with the output of the electric motor M as the W-phase modulated wave Vw* and output the minimum value or maximum value of the carrier wave as the V-phase modulated wave Vv* and the U-phase modulated wave Vu* in the third section.

Furthermore, the present disclosure is not to be considered limited to the foregoing embodiments, and various improvements and changes can be made without departing from the spirit of the present disclosure.

Modification Example 1

Figure 12:
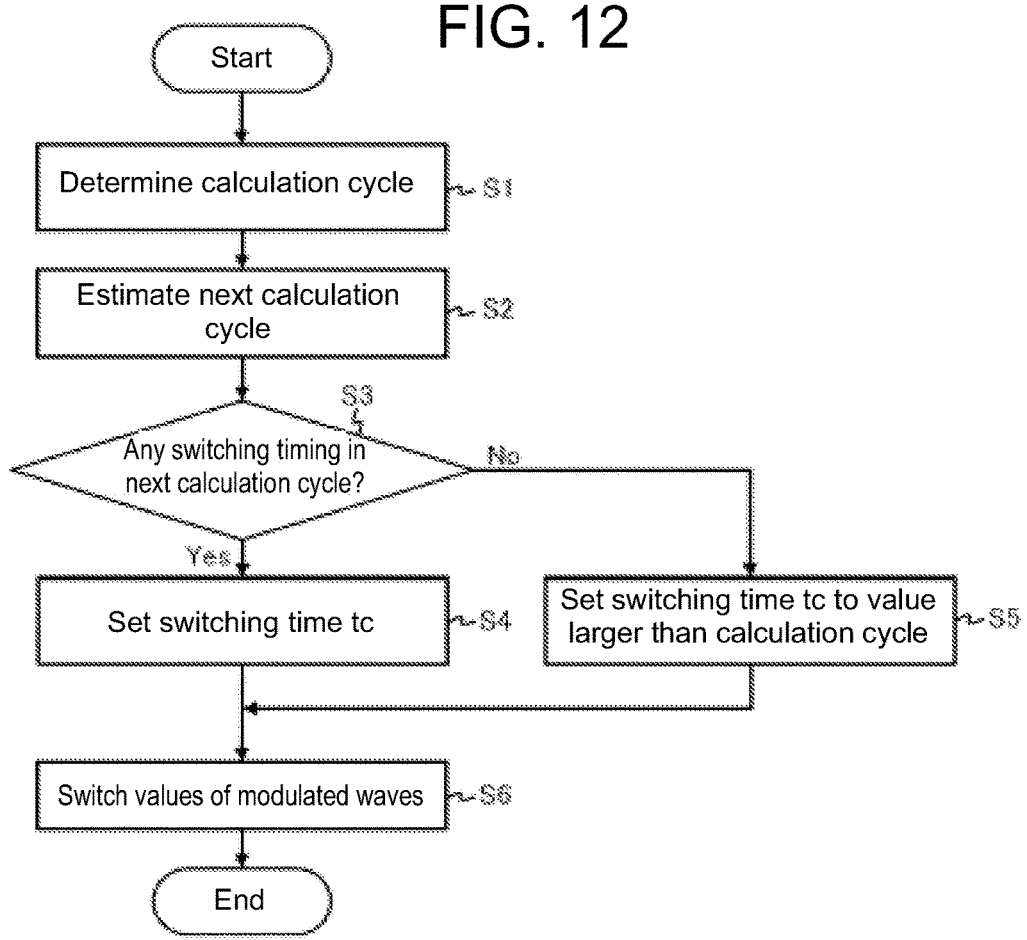
FIG. 12 is a flowchart illustrating an example of operation of the dq/uvw conversion unit according to Modification Example 1.

FIG. 12 is a flowchart illustrating an example of the operation of the dq/uvw conversion unit 15 according to Modification Example 1.

First, the dq/uvw conversion unit 15 determines the calculation cycle T of the calculation unit 5 (step S1). For example, the dq/uvw conversion unit 15 determines the difference between the electric angle θ acquired this time and the electric angle θ previously acquired as the calculation cycle T.

Next, the dq/uvw conversion unit 15 estimates the next calculation cycle T of the calculation unit 5 (step S2). For example, the dq/uvw conversion unit 15 determines the calculation timing after the calculation cycle T from the current calculation timing of the calculation unit 5 as the start timing of the next calculation cycle T of the calculation unit 5, determines the calculation timing after the calculation cycle T from the start timing as the end timing of the next calculation cycle T of the calculation unit 5, and determines the range from the start timing to the end timing as the next calculation cycle T of the calculation unit 5. It is to be noted that the U-phase modulated wave Vu*, V-phase modulated wave Vv*, and W-phase modulated wave Vw* determined at the current calculation timing will be reflected in the operation of the inverter circuit 2 in the next calculation cycle T.

Next, if there is any switching timing for the first to third sections (0 [deg], 60 [deg], 120 [deg], 180 [deg], 240 [deg], 300 [deg]) in the next calculation cycle T of the calculation unit 5 (step S3: Yes), the dq/uvw conversion unit 15 sets the switching time tc (step S4). For example, the dq/uvw conversion unit 15 determines the difference between the switching timing for the first to third sections and the start timing of the next calculation cycle T as the switching time tc.

In contrast, if there is no switching timing for the first to third sections in the next calculation cycle T of the calculation unit 5 (step S3: No), the dq/uvw conversion unit 15 sets the switching time tc to a value that is larger than the calculation cycle (step S5).

Then, the dq/uvw conversion unit 15 converts the d-axis voltage command value Vd* and the q-axis voltage command value Vq* to the U-phase modulated wave Vu*, the V-phase modulated wave Vv*, and the W-phase modulated wave Vw* with the use of the input voltage Vin and the electric angle θ, and switches the respective values of the U-phase modulated wave Vu*, V-phase modulated wave Vv*, and W-phase modulated wave Vw* after the lapse of the switching time tc at the start timing of the next calculation cycle T (step S6).

Figure 13:
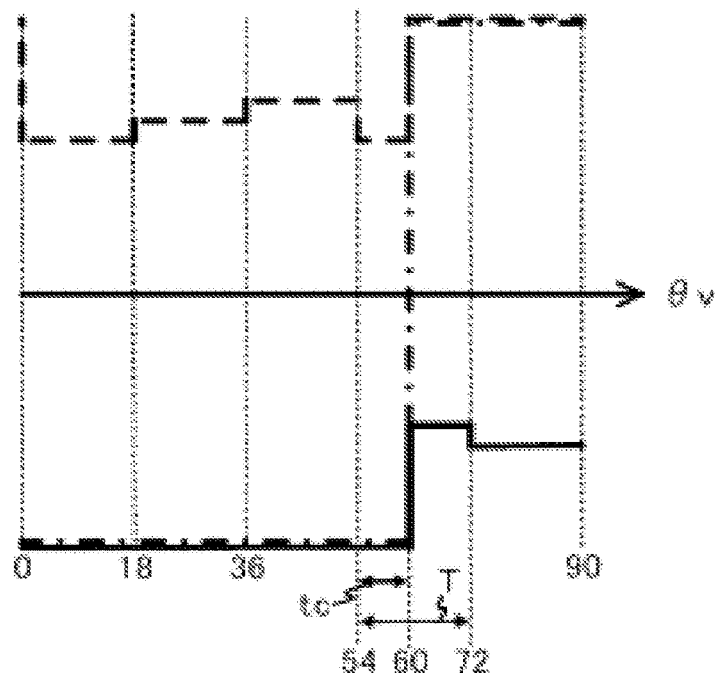
FIG. 13 is a diagram for illustrating setting of a switching time.

FIG. 13 is a diagram for illustrating setting of the switching time tc. It is to be noted that the horizontal axis in the two-dimensional coordinates illustrated in FIG. 13 indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage. In addition, the solid line illustrated in FIG. 13 indicates the U-phase modulated wave Vu*, the dashed line illustrated in FIG. 13 indicates the V-phase modulated wave Vv*, and the long dashed short dashed line illustrated in FIG. 13 indicates the W-phase modulated wave Vw*. In addition, the calculation cycle T of the calculation unit 5 is set to 18 [deg].

Assumed is, for example, a case of setting the target electric angle θv at the current calculation timing of the calculation unit 5 to 36 [deg]. Alternatively assumed is a case where the absolute value of the V-phase voltage command value Vv is larger than the absolute value of the U-phase voltage command value Vu and the absolute value of the W-phase voltage command value Vw, and where the V-phase voltage command value Vv is zero or larger.

The dq/uvw conversion unit 15 determines 36 [deg]+18 [deg]=54 [deg] as the start timing of the next calculation cycle T of the calculation unit 5, determines 54 [deg]+18 [deg]=72 [deg] as the end timing of the next calculation cycle T of the calculation unit 5, and determines 54 [deg] to 72 [deg] as the next calculation cycle T of the calculation unit 5.

Next, the dq/uvw conversion unit 15 determines the time corresponding to 60 [deg]−54 [deg]=6 [deg] as the switching time tc if the dq/uvw conversion unit 15 determines that the target electric angle θv falls within the first section (0 to 60 [deg]) or determines that the absolute value of the V-phase voltage command value Vv is larger than the absolute value of the U-phase voltage command value Vu and the absolute value of the W-phase voltage command value Vw and that the V-phase voltage command value Vv is zero or larger, and determines that there is 60 [deg] as the switching timing from the first section to the second section in the next calculation cycle T (54 [deg] to 72 [deg]).

Then, at the start timing (54 [deg]) of the next calculation cycle T, the dq/uvw conversion unit 15 switches the respective values of the U-phase modulated wave Vu*, V-phase modulated wave Vv*, and W-phase modulated wave Vw* after the lapse of the switching time tc (the time corresponding to 6 [deg]). More specifically, at 60 [deg], the dq/uvw conversion unit 15 switches the value of the V-phase modulated wave Vv* from the modulation factor Mref to the maximum value of the carrier wave, switches the value of the W-phase modulated wave Vw* from the minimum value of the carrier wave to the maximum value thereof, and switches the value of the U-phase modulated wave Vu* from the minimum value of the carrier wave to the modulation factor Mref. It is to be noted that if there is no switching timing from the first section to the second section in the next calculation cycle T of the calculation unit 5, the modulated waves are not changed in the middle of the calculation cycle, and are continuously output until the next calculation cycle.

As described above, if there is the switching timing from the first section to the second section, the switching timing from the second section to the third section, or the switching timing from the third section to the first section in the next calculation cycle T, the dq/uvw conversion unit 15 according to Modification Example 1 matches the start timing of the next calculation cycle T with the switching timing. In other words, if there is the switching timing from the first section to the second section, the switching timing from the second section to the third section, or the switching timing from the third section to the first section in the next calculation cycle T, the dq/uvw conversion unit 15 according to Modification Example 1 shifts the switching timing to after the lapse of the switching time tc from the start timing of the calculation cycle of the calculation unit 5.

Thus, the respective values of the U-phase modulated wave Vu*, V-phase modulated wave Vv*, and W-phase modulated wave Vw* may be switched at the switching timing from the first section to the second section, the switching timing from the second section to the third section, or the switching timing from the third section to the first section, and this, the switching elements can be prevented from being turned on in the case where it is not necessary to turn on the switching elements, whereas the switching elements may be prevented from being turned off in the case where it is necessary to turn on the switching elements, the distortion generated in the current flowing through the electric motor M may be further suppressed, and the fluctuation in torque may be further suppressed.

Modification Example 2

Figure 14:
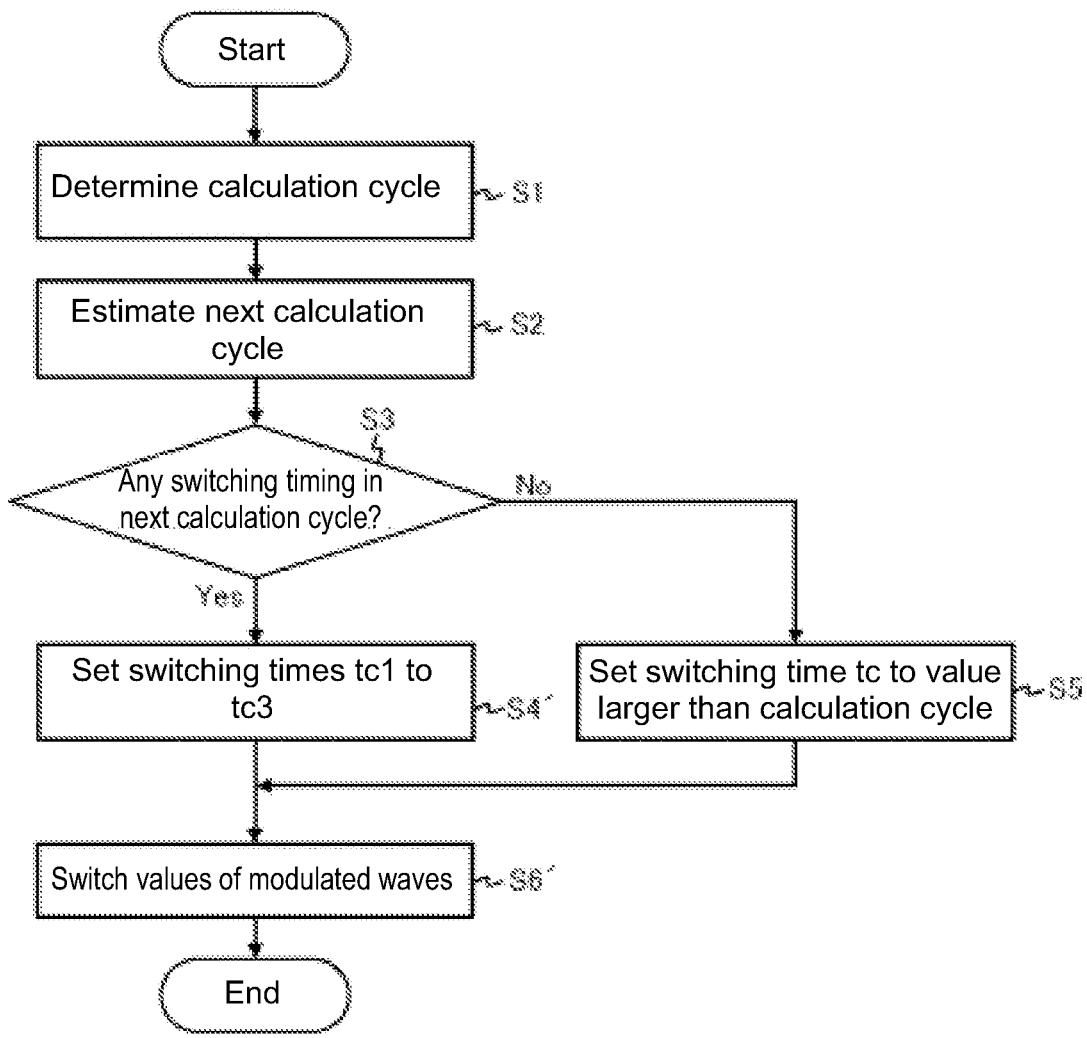
FIG. 14 is a flowchart illustrating an example of operation of the dq/uvw conversion unit according to Modification Example 2.

FIG. 14 is a flowchart illustrating an example of the operation of the dq/uvw conversion unit 15 according to Modification Example 2. It is to be noted that the steps S1, S2, S3, and S5 illustrated in FIG. 14 are considered similar to the steps S1, S2, S3, and S5 illustrated in FIG. 12, and descriptions thereof will be omitted.

The flowchart illustrated in FIG. 14 differs from the flowchart illustrated in FIG. 12 in that if there are switching timings for the first to third sections in the next calculation cycle T of the calculation unit 5 (step S3: Yes), the switching times tc1 to tc3 are set, based on modulated waves corresponding to the first to third priorities (step S4'), and at the start timing of the next calculation cycle T, the respective values of the U-phase modulated wave Vu*, V-phase modulated wave Vv*, and the W-phase modulated wave Vw* are switched after the lapse of the switching times tc1 to tc3 (step S6'). It is to be noted that the modulated wave corresponding to the first priority is a modulated wave that is switched from the modulation factor Mref' to the minimum value or maximum value of the carrier wave at the switching timings for the first to third sections. In addition, the modulated wave corresponding to the second priority is a modulated wave that is switched from the minimum value of the carrier wave to the maximum value thereof or a modulated wave that is switched from the maximum value of the carrier wave to the minimum value thereof at the switching timings for the first to third sections. It is to be noted that the modulated wave corresponding to the third priority is a modulated wave that is switched from the minimum value or maximum value of the carrier wave to the modulation factor Mref' at the switching timings for the first to third sections.

If there are switching timings for the first to third sections in the next calculation cycle T of the calculation unit 5, the dq/uvw conversion unit 15 switches the respective values of the U-phase modulated wave Vu*, V-phase modulated wave Vv*, and W-phase modulated wave Vw* in the order of the modulated wave corresponding to the first priority, the modulated wave corresponding to the second priority, and the modulated wave corresponding to the third priority at the switching timings.

More specifically, if there is any switching timing from the first section to the second section in the next calculation cycle T, the dq/uvw conversion unit 15 switches, at the switching timing, the value of the V-phase modulated wave Vv* from the modulation factor Mref' to the minimum value or maximum value of the carrier wave, then switches the value of the W-phase modulated wave Vw* from the minimum value of the carrier wave to the maximum value thereof or from the maximum value of the carrier wave to the minimum value thereof, and then switches the value of the U-phase modulated wave Vu* from the minimum value or maximum value of the carrier wave to the modulation factor Mref'.

In addition, if there is any switching timing from the second section to the third section in the next calculation cycle T, the dq/uvw conversion unit 15 switches, at the switching timing, the value of the U-phase modulated wave Vu* from the modulation factor Mref' to the minimum value or maximum value of the carrier wave, then switches the value of the V-phase modulated wave Vv* from the minimum value of the carrier wave to the maximum value thereof or from the maximum value of the carrier wave to the minimum value thereof, and then switches the value of the W-phase modulated wave Vw* from the minimum value or maximum value of the carrier wave to the modulation factor.

In addition, if there is any switching timing from the third section to the first section in the next calculation cycle T, the dq/uvw conversion unit 15 switches, at the switching timing, the value of the W-phase modulated wave Vw* from the modulation factor Mref' to the minimum value or maximum value of the carrier wave, then switches the value of the U-phase modulated wave Vu* from the minimum value of the carrier wave to the maximum value thereof or from the maximum value of the carrier wave to the minimum value thereof, and then switches the value of the V-phase modulated wave Vv* from the minimum value or maximum value of the carrier wave to the modulation factor.

Figure 15:
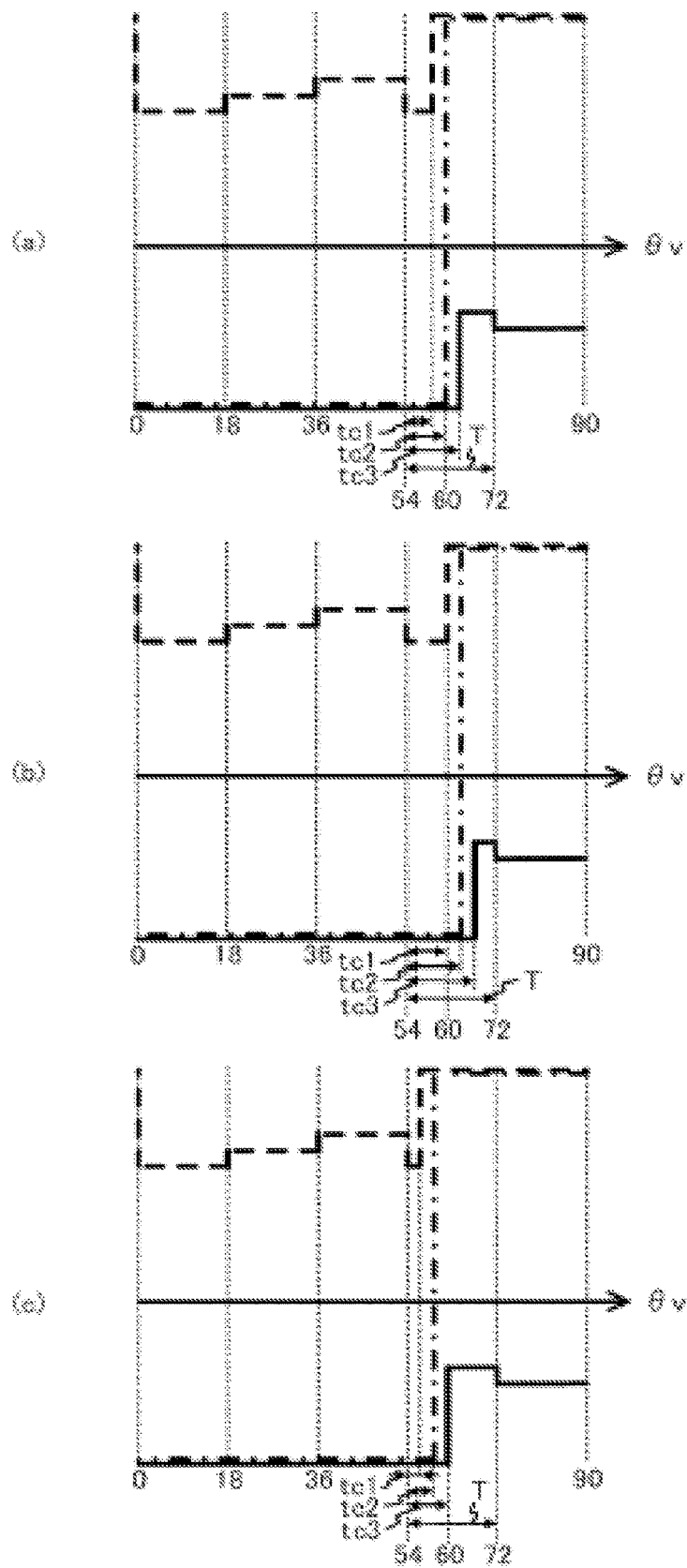
FIG. 15 is a diagram for illustrating setting of switching times.

FIG. 15 at (a) to FIG. 15 at (c) are diagrams for illustrating setting of the switching times tc1 to tc3. It is to be noted that the horizontal axis in the two-dimensional coordinates illustrated in FIG. 15 at (a) to FIG. 15 at (c) indicates the target electric angle θv obtained by adding a phase angle δ corresponding to the d-axis voltage command value Vd* and the q-axis voltage command value Vq* to the electric angle θ of the rotor of the electric motor M, whereas the vertical axis indicates a voltage. In addition, the solid lines illustrated in FIG. 15 at (a) to FIG. 15 at (c) indicate the U-phase modulated wave Vu*, the dashed lines illustrated in FIG. 15 at (a) to FIG. 15 at (c) indicate the V-phase modulated wave Vv*, and the long dashed short dashed lines illustrated in FIG. 15 at (a) to FIG. 15 at (c) indicate the W-phase modulated wave Vw*. In addition, the calculation cycle T of the calculation unit 5 is set to 18 [deg].

Assumed is, for example, a case of setting the target electric angle θv at the current calculation timing of the calculation unit 5 to 36 [deg]. Alternatively assumed is a case where the absolute value of the V-phase voltage command value Vv is larger than the absolute value of the U-phase voltage command value Vu and the absolute value of the W-phase voltage command value Vw, and where the V-phase voltage command value Vv is zero or larger.

The dq/uvw conversion unit 15 determines 36 [deg]+18 [deg]=54 [deg] as the start timing of the next calculation cycle T of the calculation unit 5, determines 54 [deg]+18 [deg]=72 [deg] as the end timing of the next calculation cycle T of the calculation unit 5, and determines 54 [deg] to 72 [deg] as the next calculation cycle T of the calculation unit 5.

Next, the dq/uvw conversion unit 15 sets the switching times tc1 to tc3 if the dq/uvw conversion unit 15 determines that the target electric angle θv falls within the first section (0 to 60 [deg]) or determines that the absolute value of the V-phase voltage command value Vv is larger than the absolute value of the U-phase voltage command value Vu and the absolute value of the W-phase voltage command value Vw and that the V-phase voltage command value Vv is zero or larger, and determines that there is 60 [deg] as the switching timing from the first section to the second section in the next calculation cycle T (54 [deg] to 72 [deg]).

For example, as illustrated in FIG. 15 at (a), the dq/uvw conversion unit 15 determines the time corresponding to 60 [deg]−54 [deg]=6 [deg] as the switching time tc2, the time that is Δt shorter than the switching time tc2 as the switching time tc1, and the time that is Δt longer than the switching time tc2 as the switching time tc3. It is to be noted that Δt is a time (electric angle) for shifting the timing of switching the respective values of the U-phase modulated wave Vu*, V-phase modulated wave Vv*, and W-phase modulated wave Vw* such that the timings of switching the respective values of the U-phase modulated wave Vu*, V-phase modulated wave Vv*, and W-phase modulated wave Vw* do not coincide with each other, and the time that is twice as long as Δt is a minimum time that can allow the distortion of the current flowing through the electric motor M even if the switching element is not repeatedly turned on and off for the time that is twice as long as Δt.

Alternatively, as illustrated in FIG. 15 at (b), the dq/uvw conversion unit 15 may determine the time corresponding to 60 [deg]−54 [deg]=6 [deg] as the switching time tc1, the time that is Δt longer than the switching time tc1 as the switching time tc2, and the time that is Δt longer than the switching time tc2 as the switching time tc3.

Alternatively, as illustrated in FIG. 15 at (c), the dq/uvw conversion unit 15 may determine the time corresponding to 60 [deg]−54 [deg]=6 [deg] as the switching time tc3, the time that is Δt shorter than the switching time tc3 as the switching time tc2, and the time that is Δt shorter than the switching time tc2 as the switching time tc1.

Then, at the start timing (54 [deg]) of the next calculation cycle T, the dq/uvw conversion unit 15 switches the value of the V-phase modulated wave Vv* from the modulation factor Mref' to the maximum value of the carrier wave after the lapse of the switching time tc1, switches the value of the W-phase modulated wave Vw* from the minimum value of the carrier wave to the maximum value thereof after the lapse of the switching time tc2, and switches the value of the U-phase modulated wave Vu* from the minimum value of the carrier wave to the modulation factor Mref' after the lapse of the switching time tc3.

As described above, the dq/uvw conversion unit 15 according to Modification Example 2 shifts the switching timings of the respective values of the U-phase modulated wave Vu*, V-phase modulated wave Vv*, and W-phase modulated wave Vw* such that the switching timings of the respective values of the U-phase modulated wave Vu*, V-phase modulated wave Vv*, and W-phase modulated wave Vw* do not overlap with each other at the switching timing from the first section to the second section, the switching timing from the second section to the third section, or the switching timing from the third section to the first section.

Then, the switching elements that differ from each other may be kept from being simultaneously turned on at the switching timing from the first section to the second section, the switching timing from the second section to the third section, or the switching timing from the third section to the first section, and thus, the generation of reverse polarity pulses may be suppressed, and electromagnetic noises may be suppressed. Accordingly, the distortion generated in the current flowing through the electric motor may be further suppressed, and the fluctuation in torque may be further suppressed.

Modification Example 3

As in the Modification Example 1 and Modification Example 2, in the case where there are switching timings for the first to third sections in the next calculation cycle T of the calculation unit 5 and where the switching timings are shifted from the start timing of the calculation cycle of the calculation unit 5 after the lapse of the switching time tc or the switching time tc1, there is a possibility that the error between the duty ratio of the drive signal S and desired duty ratio will be relatively increased.

Figure 16:
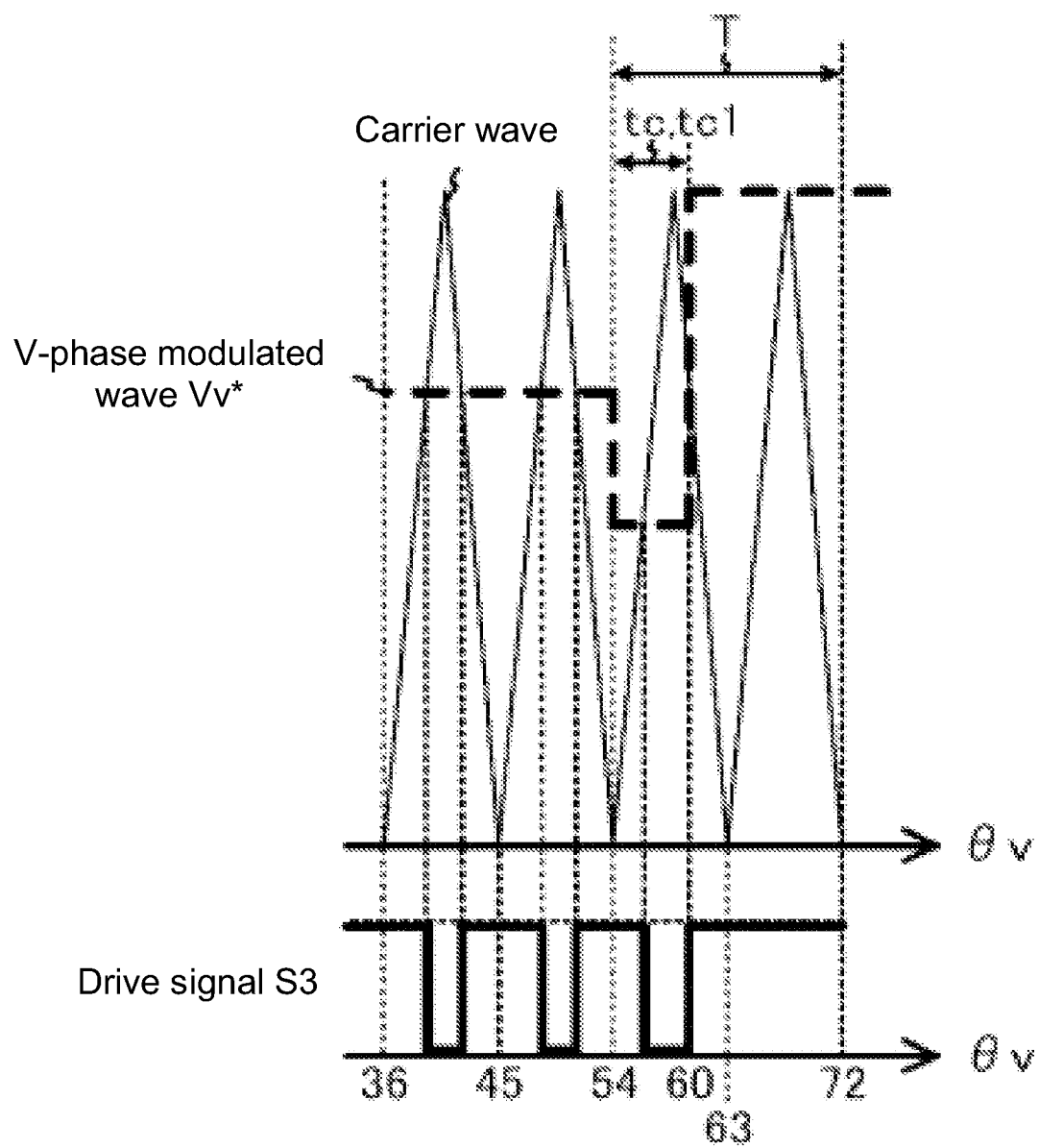
FIG. 16 is a diagram illustrating an example of a V-phase modulated wave, a carrier wave, and a drive signal according to Modification Example 1.

FIG. 16 is a diagram illustrating an example of a V-phase modulated wave Vv*, a carrier wave, and a drive signal S3 according to Modification Example 1 or Modification Example 2. It is to be noted that one cycle of the carrier wave is set to 9 [deg].

In FIG. 16, at the start timing (54 [deg]) of the next calculation cycle T, the dq/uvw conversion unit 15 switches the value of the V-phase modulated wave Vv* from the modulation factor Mref' to the maximum value of the carrier wave after the lapse of the switching time tc or the switching time tc1 (the time corresponding to 6 [deg]).

As described above, in the case where there are switching timings for the first to third sections in the next calculation cycle T and where the switching time tc or the switching time tc1 is shorter than one cycle of the carrier wave, the V-phase modulated wave Vv* is switched from the modulation factor Mref' to the maximum value of the carrier wave before the lapse of one cycle of the carrier wave from the start timing of the next calculation cycle T, and the duty ratio of the drive signal S3 fails to match the duty ratio corresponding to the modulation factor Mref'. More specifically, if there are switching timings for the first to third sections in the next calculation cycle T, there is a possibility that the error between the duty ratio of the drive signal S and a desired duty ratio will be relatively increased. Then, if the error between the duty ratio of the drive signal S and the desired duty ratio is relatively increased, lower-order harmonics (beats) may be applied onto the current flowing through the electric motor M, thereby increasing the torque ripple and the noise vibration.

Therefore, in the control device 1 for the electric motor M according to Modification Example 3, in the case where there are switching timings for the first to third sections in the next calculation cycle T, the frequency f of the carrier wave is switched to a predetermined frequency such that the error between the duty ratio of the drive signal S and the desired duty ratio is relatively decreased in the period from the start timing of the next calculation cycle T to the lapse of the switching time tc.

Figure 17:
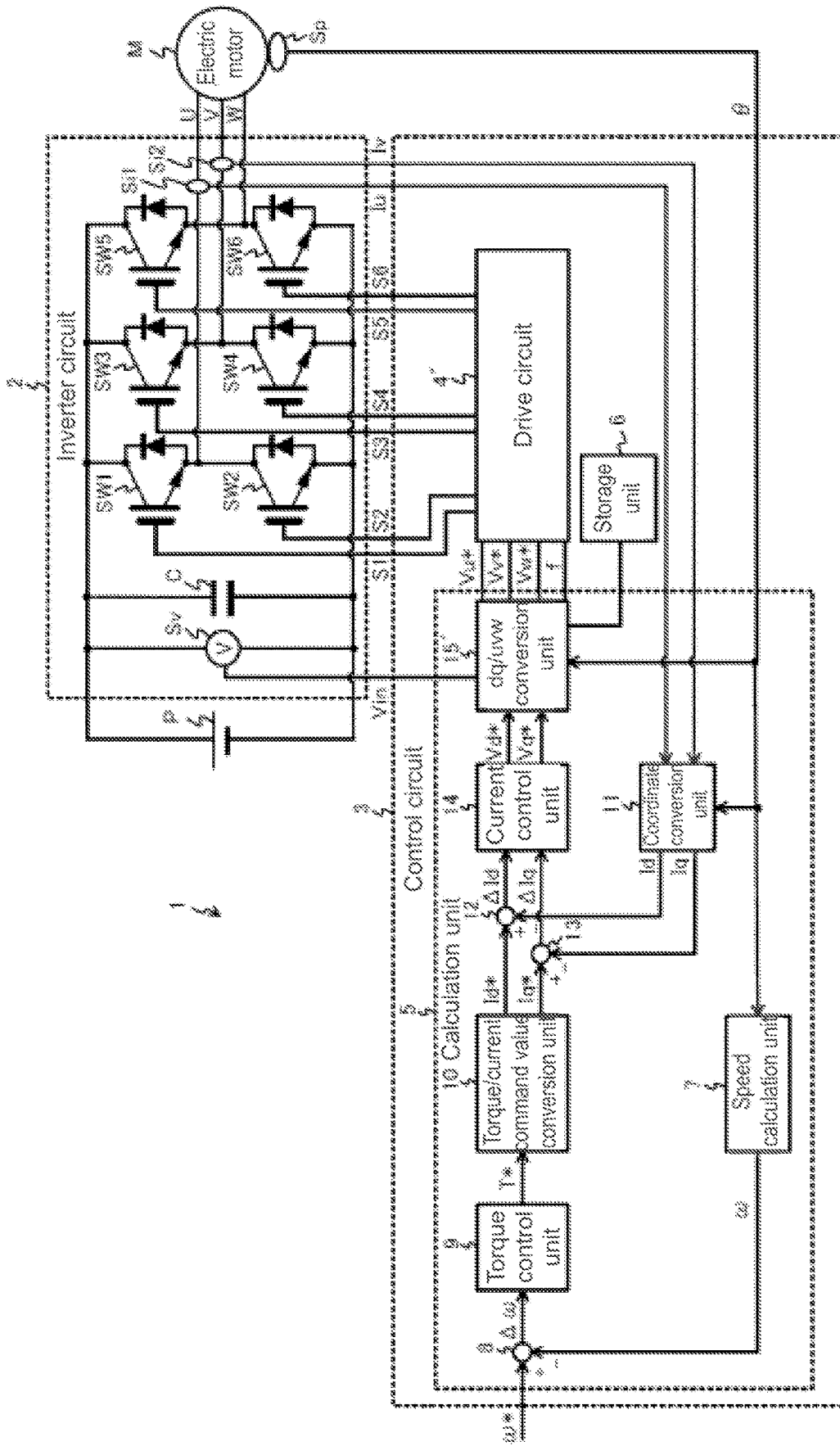
FIG. 17 is a diagram illustrating an example of a control device for an electric motor according to Modification Example 3.

FIG. 17 is a diagram illustrating an example of the control device 1 for the electric motor M according to Modification Example 3. It is to be noted that the same components as those illustrated in FIG. 1 are denoted by the same reference numerals.

The control device 1 for the electric motor M, illustrated in FIG. 17, differ from the control device 1 for the electric motor M, illustrated in FIG. 1, in that a dq/uvw conversion unit 15' and a drive circuit 4' are provided instead of the dq/uvw conversion unit 15 and the drive circuit 4.

The dq/uvw conversion unit 15' converts a d-axis voltage command value Vd* and a q-axis voltage command value Vq* to a U-phase modulated wave Vu*, a V-phase modulated wave Vv*, and a W-phase modulated wave Vw* with the use of an input voltage Vin detected by voltage sensor Sv and an electric angle θ detected by electric angle detection unit Sp, and sets the frequency f of the carrier wave to a predetermined frequency. It is to be noted that the results (U-phase modulated wave Vu*, V-phase modulated wave Vv*, W-phase modulated wave Vw*, and frequency f) calculated by the calculation unit 5 will be reflected in the operation of the inverter circuit 2 in the next calculation cycle T of the calculation unit 5.

The drive circuit 4 includes an IC and the like, compares the U-phase modulated wave Vu*, V-phase modulated wave Vv*, and W-phase modulated wave Vw* output from the dq/uvw conversion unit 15' with the carrier wave with the frequency f output from the dq/uvw conversion unit 15', and outputs the drive signals S1 to S6 corresponding to the comparison results to the respective gate terminals of the switching elements SW1 to SW6.

Figure 18A:
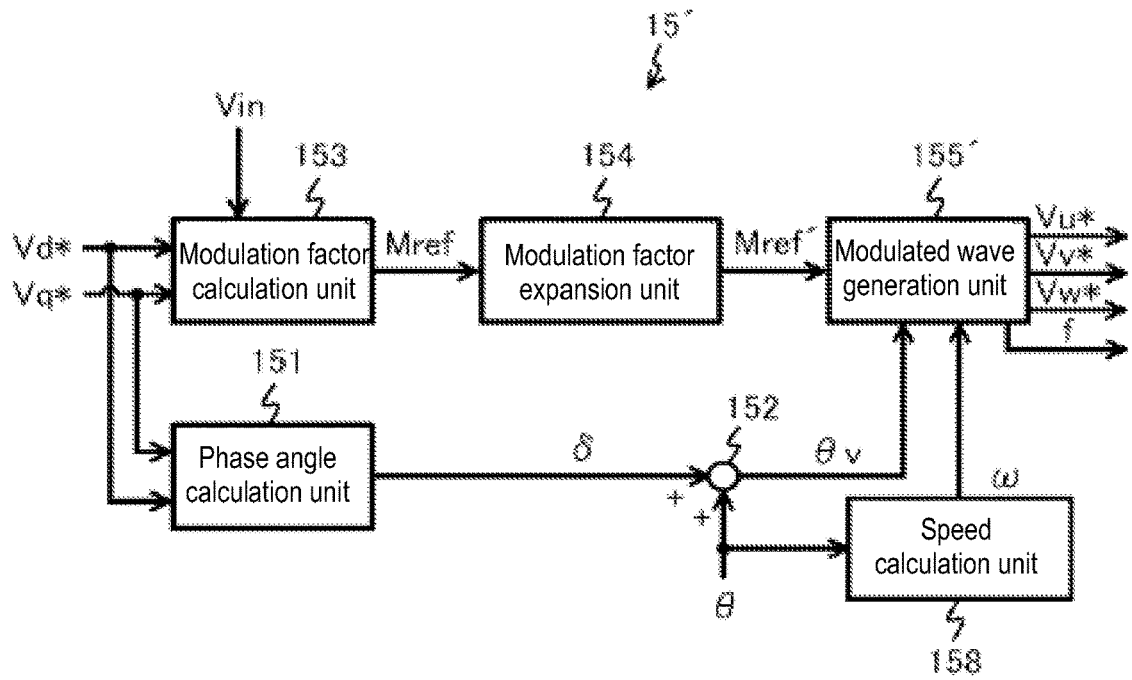
FIGS. 18A and 18B are diagrams illustrating examples of a dq/uvw conversion unit according to Modification Example 3.

FIG. 18A is a diagram illustrating an example of the dq/uvw conversion unit 15'. It is to be noted that the same components as those illustrated in FIG. 10A are denoted by the same reference numerals.

The dq/uvw conversion unit 15' illustrated in FIG. 18A includes a phase angle calculation unit 151, an addition unit 152, a modulation factor calculation unit 153, a modulation factor expansion unit 154, a modulated wave generation unit 155', and a speed calculation unit 158.

The speed calculation unit 158 calculates the rotational speed ω of the rotor of electric motor M with the use of the electric angle θ detected by the electric angle detection unit Sp. For example, the speed calculation unit 158 differentiates the electric angle θ with respect to time to determine the rotational speed ω.

The modulated wave generation unit 155' generates the U-phase modulated wave Vu*, the V-phase modulated wave Vv*, and the W-phase modulated wave Vw* with the use of a target electric angle θv output from the addition unit 152, a modulation factor Mref' output from the modulation factor expansion unit 154, and the rotational speed ω calculated by the speed calculation unit 158, and sets the frequency f of the carrier wave to a predetermined frequency. For example, the modulated wave generation unit 155' refers to the information D1 stored in the storage unit 6 to determine the U-phase modulated wave Vu*, the V-phase modulated wave Vv*, and the W-phase modulated wave Vw* corresponding to the target electric angle θv output from the addition unit 152. In addition, the modulated wave generation unit 155' sets the frequency f of the carrier wave to a default frequency fd, a frequency fc that is the reciprocal of the switching time tc, or a frequency fc1 that is the reciprocal of the switching time tc1. It is to be noted that the default frequency fd is, for example, a frequency in accordance with the calculation cycle of the calculation unit 5 or the rotational speed ω.

Figure 18B:
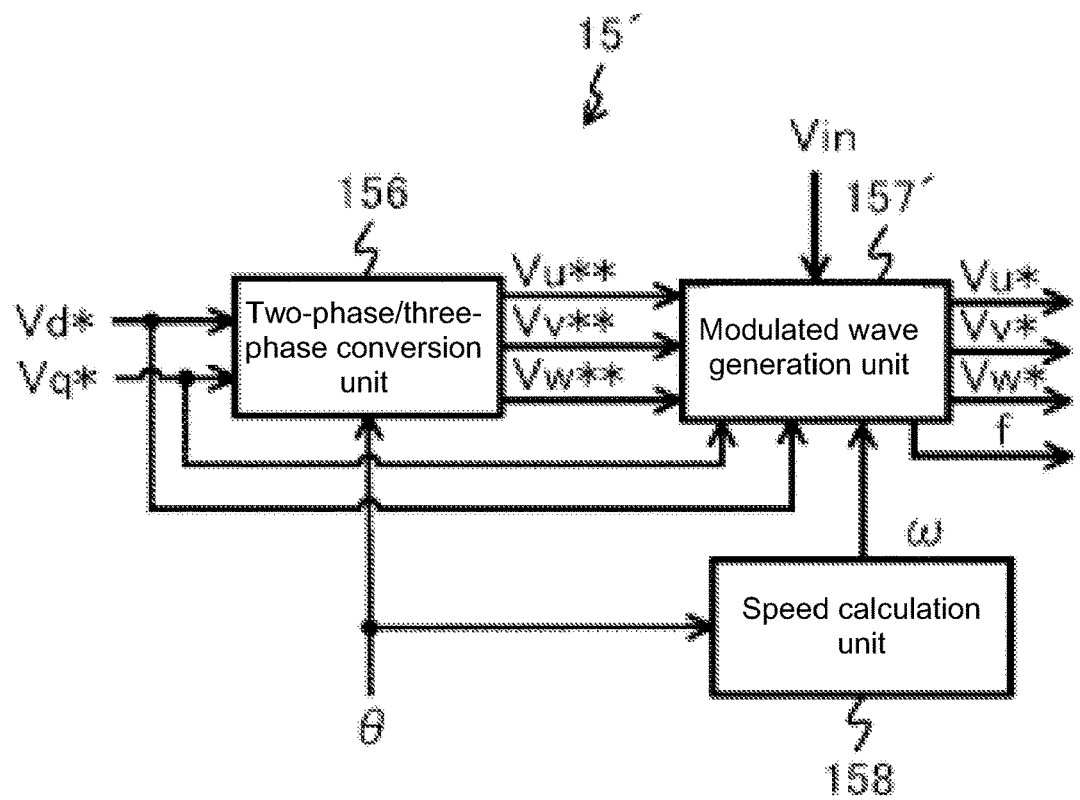

FIG. 18B is a diagram illustrating another example of the dq/uvw conversion unit 15'. It is to be noted that the same components as those illustrated in FIG. 11A and FIG. 18A are denoted by the same reference numerals.

The dq/uvw conversion unit 15' illustrated in FIG. 18B includes a two-phase/three-phase conversion unit 156, a modulated wave generation unit 157', and a speed calculation unit 158.

The modulated wave generation unit 157' generates the U-phase modulated wave Vu*, the V-phase modulated wave Vv*, and the W-phase modulated wave Vw* with the use of the input voltage Vin detected by the voltage sensor Sv, the d-axis voltage command value Vd* and q-axis voltage command value Vq* output from the current control unit 14, and the U-phase voltage command value Vu, V-phase voltage command value Vv, and W-phase voltage command value Vw output from two-phase/three-phase conversion unit 156, and sets the frequency f of the carrier wave to a predetermined frequency. For example, the modulated wave generation unit 157' calculates the above-mentioned formula 3 to determine the phase angle δ, determines, as the target electric angle θv, the result of adding the phase angle δ and the electric angle θ output from the electric angle detection unit Sp, calculates the above-mentioned formula 4 to determine the modulation factor Mref, and calculates the above-mentioned formula 5 to determine the modulation factor Mref'. In addition, the modulated wave generation unit 157' refers to the information D2 stored in the storage unit 6** to determine the U-phase modulated wave Vu*, V-phase modulated wave Vv*, and W-phase modulated wave Vw* corresponding to the branching conditions obtained from the U-phase voltage command value Vu, V-phase voltage command value Vv, and W-phase voltage command value Vw output from the two-phase/three-phase conversion unit 156. In addition, the modulated wave generation unit 157'** sets the frequency f of the carrier wave to the frequency fd, the frequency fc, or the frequency fc1.

Figure 19:
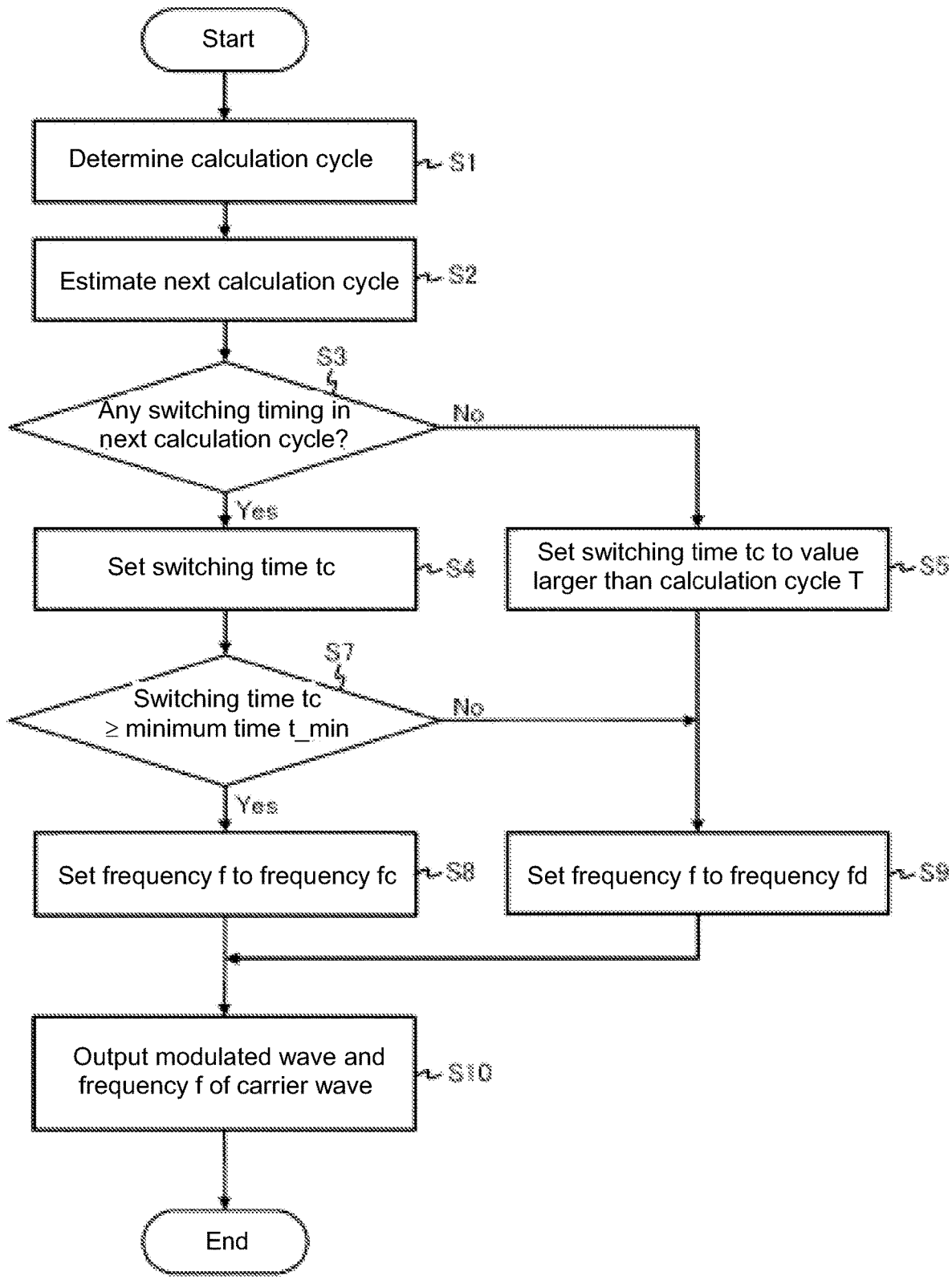
FIG. 19 is a flowchart illustrating an example of operation of the dq/uvw conversion unit according to Modification Example 3.

FIG. 19 is a flowchart illustrating an example of the operation of the dq/uvw conversion unit 15'. It is to be noted that the steps S1 to S5 illustrated in FIG. 19 are similar to the steps S1 to S5 illustrated in FIG. 12.

First, the dq/uvw conversion unit 15' determines the calculation cycle T of the calculation unit 5 (step S1), estimates the next calculation cycle T of the calculation unit 5 (step S2), and determines if there is any switching timing for the first to third sections in the next calculation cycle T of the calculation unit 5 (step S3).

Next, in the next calculation cycle T of the calculation unit 5, if there is any switching timing for the first to third sections (step S3: Yes), the dq/uvw conversion unit 15' sets the switching time tc based on the switching timing (step S4), if the switching time tc is equal to or longer than the minimum time t_min (step S7: Yes), the dq/uvw conversion unit 15' sets the frequency f of the carrier wave to the frequency fc (step S8), and the dq/uvw conversion unit 15' proceeds to a step 10. The minimum time t_min refers to the minimum value of one cycle of the carrier wave in the case where the switching elements SW1 to SW6 can be switched from off to on or from on to off.

In contrast, in the next calculation cycle T of the calculation unit 5, if there is no switching timing for the first to third sections (step S3: No), the dq/uvw conversion unit 15' sets the switching time tc to a value that is greater than the next calculation cycle T (step S5), sets the frequency f of the carrier wave to the frequency fd (step S9), and proceeds to the step S10.

In addition, if the switching time tc is shorter than the minimum time t_min (step S7: No), the dq/uvw conversion unit 15' sets the frequency f of the carrier wave to the frequency fd (step S9), and proceeds to step S10.

Next, in the step S10, the dq/uvw conversion unit 15' converts the d-axis voltage command value Vd* and the q-axis voltage command value Vq* to the U-phase modulated wave Vu*, the V-phase modulated wave Vv*, and the W-phase modulated wave Vw* with the use of the input voltage Vin and the electric angle θ, outputs the U-phase modulated wave Vu*, V-phase modulated wave Vv*, and W-phase modulated wave Vw* to the drive circuit 4' at the start timing of the next calculation cycle T, and outputs the frequency f to the drive circuit 4'.

In addition, in the step S10, after the elapse of the switching time tc from the start timing of the next calculation cycle T the dq/uvw conversion unit 15' switches the U-phase modulated wave Vu*, the V-phase modulated wave Vv*, and the W-phase modulated wave Vw* from the modulation factor Mref to the maximum value of the carrier wave, from the minimum value of the carrier wave to the modulation factor Mref', from the minimum value of the carrier wave to the maximum value of the carrier wave, from the maximum value of the carrier wave to the minimum value of the carrier wave, from the modulation factor Mref' to the minimum value of the carrier wave, or from the maximum value of the carrier wave to the modulation factor Mref', and switches the frequency f to the frequency fd.

Figure 20:
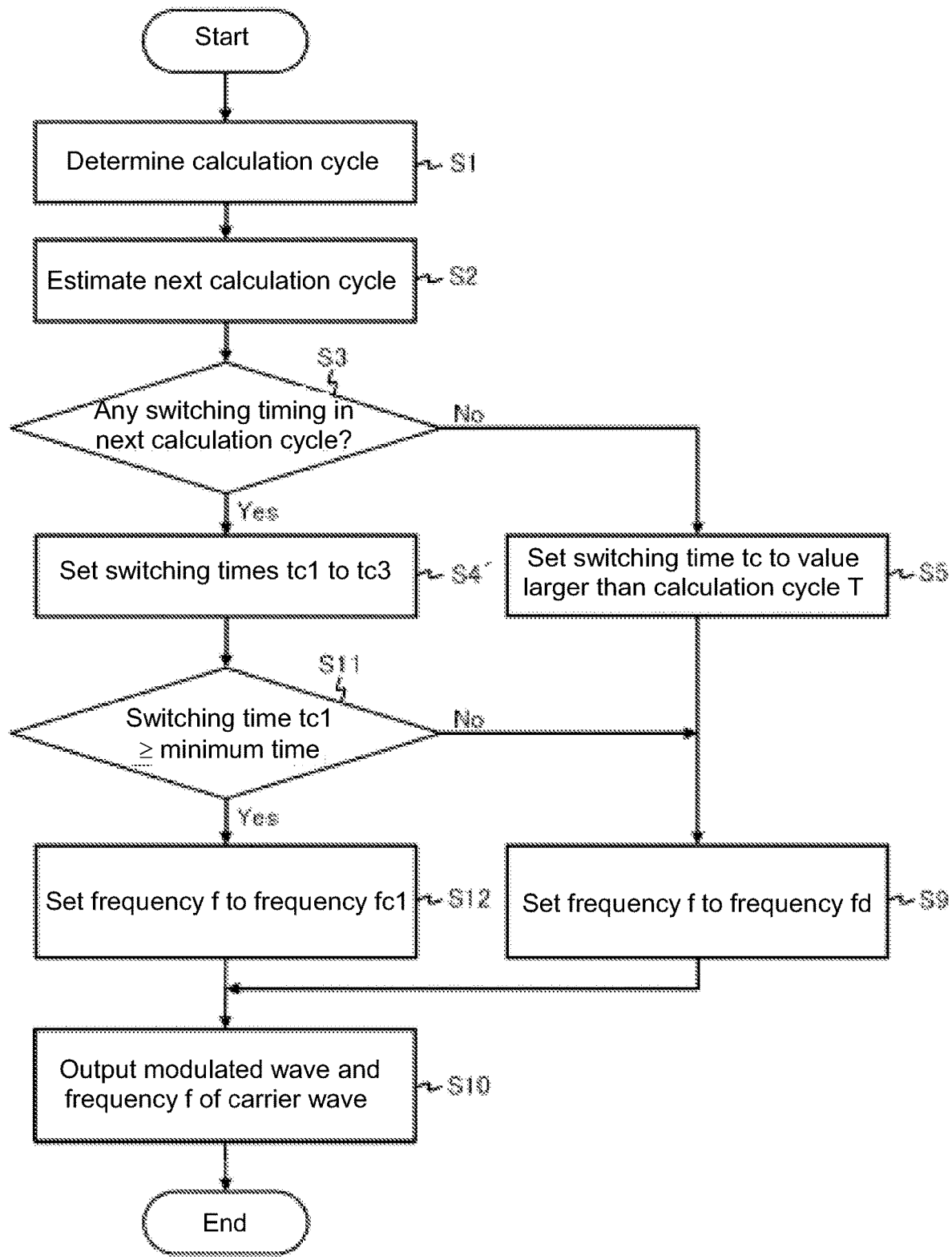
FIG. 20 is a flowchart illustrating another example of the operation of the dq/uvw conversion unit according to Modification Example 3.

FIG. 20 is a flowchart illustrating another example of the operation of the dq/uvw conversion unit 15'. It is to be noted that the steps S1 to S4' and S5 illustrated in FIG. 20 are similar to the steps S1 to S4' and S5 illustrated in FIG. 14.

In addition, the steps S9 and S10 illustrated in FIG. 20 are similar to the steps S9 and S10 illustrated in FIG. 19.

First, the dq/uvw conversion unit 15' determines the calculation cycle T of the calculation unit 5 (step S1), estimates the next calculation cycle T of the calculation unit 5 (step S2), and determines if there is any switching timing for the first to third sections in the next calculation cycle T of the calculation unit 5 (step S3).

Next, in the next calculation cycle T of the calculation unit 5, if there is switching timings for the first to third sections (step S3: Yes), the dq/uvw conversion unit 15' sets switching times tc1 to tc3 based on the switching timing (step S4'), if the switching time tc1 is equal to or longer than the minimum time t_min (step S11: Yes), the dq/uvw conversion unit 15' sets the frequency f to the frequency fc1 (step S12), and the dq/uvw conversion unit 15' proceeds to a step S10.

In contrast, in the next calculation cycle T of the calculation unit 5, if there is no switching timing for the first to third sections (step S3: No), the dq/uvw conversion unit 15' sets the switching time tc to a value that is greater than the next calculation cycle T (step S5), sets the frequency f to the frequency fd (step S9), and proceeds to the step S10.

In addition, if the switching time tc1 is shorter than the minimum time t_min (step S11: No), the dq/uvw conversion unit 15' sets the frequency f to the frequency fd (step S9), and proceeds to step S10.

Next, in the step S10, the dq/uvw conversion unit 15' converts the d-axis voltage command value Vd* and the q-axis voltage command value Vq* to the U-phase modulated wave Vu*, the V-phase modulated wave Vv*, and the W-phase modulated wave Vw* with the use of the input voltage Vin and the electric angle θ, outputs the U-phase modulated wave Vu*, V-phase modulated wave Vv*, and W-phase modulated wave Vw* to the drive circuit 4' at the start timing of the next calculation cycle T, and outputs the frequency f to the drive circuit 4'.

In addition, in the step S10, after the elapse of the switching time tc from the start timing of the next calculation cycle T the dq/uvw conversion unit 15' switches the U-phase modulated wave Vu*, the V-phase modulated wave Vv*, and the W-phase modulated wave Vw* from the modulation factor Mref' to the maximum value of the carrier wave, from the minimum value of the carrier wave to the modulation factor Mref', from the minimum value of the carrier wave to the maximum value of the carrier wave, from the maximum value of the carrier wave to the minimum value of the carrier wave, from the modulation factor Mref' to the minimum value of the carrier wave, or from the maximum value of the carrier wave to the modulation factor Mref', and switches the frequency f to the frequency fd.

Accordingly, in the next calculation cycle T of the calculation unit 5, if there is no switching timing for the first to third sections, the U-phase modulated wave Vu*, the V-phase modulated wave Vv*, and the W-phase modulated wave Vw* are not switched while remaining to have the same values in the next calculation cycle T.

In addition, in the next calculation cycle T of the calculation unit 5, if there is no switching timing for the first to third sections, the frequency f of the carrier wave is not switched while remaining to be set to the frequency fd in the next calculation cycle T.

In contrast, in the next calculation cycle T of the calculation unit 5, if there are switching timings for the first to third sections, at the timing of lapse of the switching time tc or the switching time tc1 from the start timing of the next calculation cycle T, the U-phase modulated wave Vu*, the V-phase modulated wave Vv*, and the W-phase modulated wave Vw* are switched from the modulation factor Mref' to the maximum value of the carrier wave, from the minimum value of the carrier wave to the modulation factor Mref', from the minimum value of the carrier wave to the maximum value of the carrier wave, from the maximum value of the carrier wave to the minimum value of the carrier wave, from the modulation factor Mref' to the minimum value of the carrier wave, or from the maximum value of the carrier wave to the modulation factor Mref'.

In addition, in the next calculation cycle T of the calculation unit 5, if there are switching timings for the first to third sections, the frequency f of the carrier wave is set to the frequency fc or the frequency fc1 in the period from the start timing of the next calculation cycle T to the lapse of the switching time tc or the switching time tc1, and the frequency f of the carrier wave is set to the frequency fd in the period from the timing of the lapse of the switching timing time tc or the switching time tc1 to the end timing of the next calculation cycle T.

Figure 21:
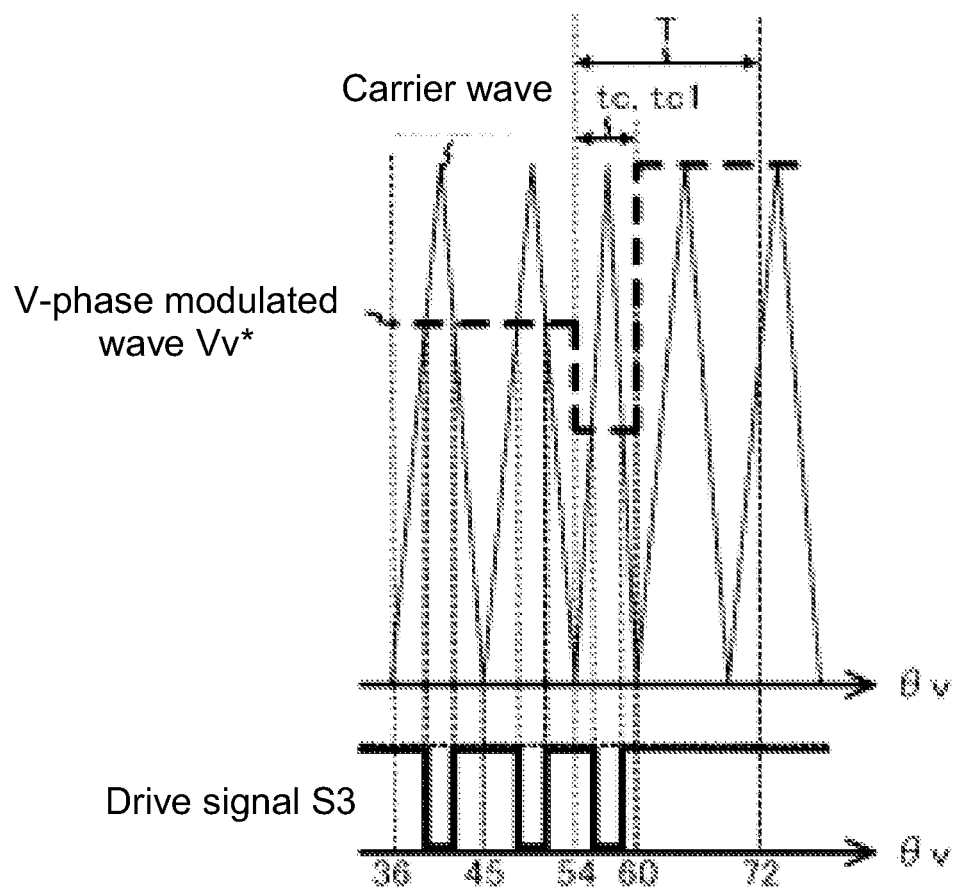
FIG. 21 is a diagram illustrating an example of a V-phase modulated wave, a carrier wave, and a drive signal according to Modification Example 3.

FIG. 21 is a diagram illustrating an example of a V-phase modulated wave Vv*, a carrier wave, and a drive signal S3 according to Modification Example 3. It is to be noted that each calculation cycle of the calculation unit 5 is set to 18 [deg], and one cycle of the carrier wave in the case of the frequency f being set to the frequency fd is set to 9 [deg].

First, the dq/uvw conversion unit 15' determines 36 [deg]+18 [deg]=54 [deg] as the start timing of the next calculation cycle T of the calculation unit 5, determines 54 [deg]+18 [deg]=72 [deg] as the end timing of the next calculation cycle T of the calculation unit 5, and determines 54 to 72 [deg] as the next calculation cycle T of the calculation unit 5.

Next, the dq/uvw conversion unit 15' determines the time corresponding to 60 [deg]−54 [deg]=6 [deg] as the switching time tc or the switching time tc1 if the dq/uvw converter 15' determines that the target electric angle θv falls within the first section (0 to 60 [deg]) or determines that the absolute value of the V-phase voltage command value Vv is larger than the absolute value of the U-phase voltage command value Vu and the absolute value of the W-phase voltage command value Vw and that the V-phase voltage command value Vv is zero or larger, and determines that there is 60 [deg] as the switching timing from the first section to the second section in the next calculation cycle T (54 [deg] to 72 [deg]) of the calculation unit 5.

Next, if the dq/uvw converter 15' determines that the switching time tc or the switching time tc1 is equal to or longer than the minimum time t_min, the dq/uvw conversion unit 15' sets the frequency f of the carrier wave to the frequency fc or the frequency fc1.

Next, at the start timing (54 [deg]) of the next calculation cycle T of the calculation unit 5, the dq/uvw conversion unit 15' outputs the modulation factor Mref' to the drive circuit 4' as the V-phase modulated wave Vv*, and outputs the frequency fc or the frequency fc1 as the frequency f to the drive circuit 4'.

Next, after the lapse of the switching time tc (60 [deg]), the dq/uvw conversion unit 15' switches the V-phase modulated wave Vv* output to the drive circuit 4', from the modulation factor Mref' to the maximum value of the carrier wave, and switches the frequency f output to the drive circuit 4', from the frequency fc or the frequency fc1 to the frequency fd.

Then, the dq/uvw conversion unit 15' outputs the maximum value of the carrier wave as the V-phase modulated wave Vv* to the drive circuit 4' and outputs the frequency fd as the frequency f to the drive circuit 4' until the end timing (72 [deg]) of the next calculation cycle T of the calculation unit 5.

More specifically, in the next calculation cycle T of the calculation unit 5, if there are switching timings for the first to third sections, the dq/uvw conversion unit 15' switches the frequency f of the carrier wave in the period from the start timing of the next calculation cycle T to the lapse of the switching time tc or the switching time tc1, from the default frequency fd to the frequency fc that is the reciprocal of the switching time tc or the frequency fc1 that is the reciprocal of the switching time tc1.

Thus, in the period from the start timing of the next calculation cycle T to the lapse of the switching time tc or the switching time tc1, one cycle of the carrier wave may be matched with the switching time tc or the switching time tc1, and thus, the V-phase modulated wave Vv* may be kept from being switched from the modulation factor Mref' to the maximum value of the carrier wave in the middle of the elapse of the switching time tc or the switching time tc1. Accordingly, in the period from the start timing of the next calculation cycle T to the lapse of the switching time tc or the switching time tc1, the duty ratio of the drive signal S3 may be matched with the duty ratio in accordance with the modulation factor Mref'.

As described above, in the control device 1 for the electric motor M according to Modification Example 3, if there are switching timing for the first to third sections in the next calculation cycle T of the calculation unit 5, the error between the duty ratio of the drive signal S and the desired duty ratio may be reduced by setting the frequency f of the carrier wave to the frequency fc that is the reciprocal of the switching time tc or the frequency fc1 that is the reciprocal of the switching time tc1, and thus, lower-order harmonics may be kept from being applied onto the current flowing through the electric motor M, and torque ripples and noise vibrations may be kept from being increased.

REFERENCE SIGNS LIST

1 control device
2 inverter circuit
3 control circuit
4 drive circuit
4' drive circuit
5 calculation unit
6 storage unit
7 speed calculation unit
8 subtraction unit
9 torque control unit
10 torque/current command value conversion unit
11 coordinate conversion unit
12 subtraction unit
13 subtraction unit
14 current control unit
15 dq/uvw conversion unit
15' dq/uvw conversion unit
151 phase angle calculation unit
152 addition unit
153 modulation factor calculation unit
154 modulation factor expansion unit
155 modulated wave generation unit
155' modulated wave generation unit
156 two-phase/three-phase conversion unit
157 modulated wave generation unit
157' modulated wave generation unit
158 speed calculation unit

The invention claimed is:

1. A control device for an electric motor, comprising:
an inverter circuit including:
a first switching element that is repeatedly turned on and off at a duty ratio in accordance with a first modulated wave in a case where the first modulated wave is smaller than a maximum value of a carrier wave and larger than a minimum value of the carrier wave, and is always turned on or always turned off in a case where the first modulated wave is the minimum value or maximum value of the carrier wave;
a second switching element that is repeatedly turned on and off at a duty ratio in accordance with a second modulated wave in a case where the second modulated wave is smaller than the maximum value of the carrier wave and larger than the minimum value of the carrier wave, and is always turned on or always turned off in a case where the second modulated wave is the minimum value or maximum value of the carrier wave; and
a third switching element that is repeatedly turned on and off at a duty ratio in accordance with a third modulated wave in a case where the third modulated wave is smaller than the maximum value of the carrier wave and larger than the minimum value of the carrier wave, and is always turned on or always turned off in a case where the third modulated wave is the minimum value or maximum value of the carrier wave, wherein the first to third switching elements are turned on or off to apply first to third alternate-current voltages that differ in phase from each other to three phases of the electric motor to drive the electric motor; and
a control circuit that, in a control cycle of the electric motor, the control cycle including first to third sections, outputs the first modulated wave in accordance with an output of the electric motor and outputs the minimum value or maximum value of the carrier wave as the second and third modulated waves in the first section with a peak of the first alternate-current voltage, outputs the second modulated wave in accordance with an output of the electric motor and outputs the minimum value or maximum value of the carrier wave as the first and third modulated waves in the second section with a peak of the second alternate-current voltage, and outputs the third modulated wave in accordance with an output of the electric motor and outputs the minimum value or maximum value of the carrier wave as the first and second modulated waves in the third section with a peak of the third alternate-current voltage.

2. The control device for the electric motor according to claim 1, wherein
the control device comprises an electric angle detection unit that detects an electric angle of a rotor of the electric motor, and
the control circuit includes:
a target electric angle calculation unit that calculates a target electric angle from a voltage command value in accordance with an output of the electric motor and the electric angle detected by the electric angle detection unit; and
a modulated wave generation unit that, with the target electric angle within the first section, determines a modulation factor obtained by using an input voltage of the inverter circuit and the voltage command value as the first modulated wave and determines the minimum value or maximum value of the carrier wave as the second and third modulated waves, with the target electric angle within the second section, determines a modulation factor obtained by using the input voltage of the inverter circuit and the voltage command value as the second modulated wave and determines the minimum value or maximum value of the carrier wave as the first and third modulated waves, and with the target electric angle within the third section, determines a modulation factor obtained by using the input voltage of the inverter circuit and the voltage command value as the third modulated wave and determines the minimum value or maximum value of the carrier wave as the first and second modulated waves.

3. The control device for the electric motor according to claim 1, wherein the control device comprises an electric angle detection unit that detects an electric angle of a rotor of the electric motor, and the control circuit includes:

a voltage command value calculation unit that calculates a first voltage command value corresponding to the first alternate-current voltage, a second voltage command value corresponding to the second alternate-current voltage, and a third voltage command value corresponding to the third alternate-current voltage from a voltage command value in accordance with an output of the electric motor and the electric angle detected by the electric angle detection unit; and a modulated wave generation unit that, with the first voltage command value being larger in absolute value than the second and third voltage command values, determines a modulation factor obtained by using an input voltage of the inverter circuit and the voltage command value in accordance with the output of the electric motor as the first modulated wave and determines the minimum value or maximum value of the carrier wave as the second and third modulated waves, with the second voltage command value being larger in absolute value than the first and third voltage command values, determines a modulation factor obtained by using the input voltage of the inverter circuit and the voltage command value in accordance with the output of the electric motor as the second modulated wave and determines the minimum value or maximum value of the carrier wave as the first and third modulated waves, and with the third voltage command value being larger in absolute value than the first and second voltage command values, determines a modulation factor obtained by using the input voltage of the inverter circuit and the voltage command value in accordance with the output of the electric motor as the third modulated wave and determines the minimum value or maximum value of the carrier wave as the first and second modulated waves.

4. The control device for the electric motor according to claim 1, wherein if there is a switching timing from the first section to the second section, a switching timing from the second section to the third section, or a switching timing from the third section to the first section in the next calculation cycle, the control circuit matches a start timing of the next calculation cycle with the switching timing.

5. The control device for the electric motor according to claim 4, wherein the control circuit shifts the switching timings of respective values of the first to third modulated waves such that the switching timings of the respective values of the first to third modulated waves do not overlap with each other at the switching timing from the first section to the second section, the switching timing from the second section to the third section, or the switching timing from the third section to the first section.

6. The control device for the electric motor according to claim 4, wherein if there is the switching timing from the first section to the second section, the switching timing from the second section to the third section, or the switching timing from the third section to the first section in the next calculation cycle, the control circuit is configured to determine a switching time from the start timing of the next calculation cycle to the switching timing, and set a frequency that is a reciprocal of the switching time as the frequency of the carrier wave in a period from the start timing of the next calculation cycle to a lapse of the switching time.

* * * * *